(12) United States Patent
Adachi et al.

(10) Patent No.: US 10,999,850 B2
(45) Date of Patent: May 4, 2021

(54) COMMUNICATION DEVICE AND BASE STATION

(71) Applicant: KYOCERA Corporation, Kyoto (JP)

(72) Inventors: Hiroyuki Adachi, Kawasaki (JP);
Takahiro Saiwai, Yokohama (JP);
Masato Fujishiro, Yokohama (JP);
Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/319,860

(22) PCT Filed: Jul. 25, 2017

(86) PCT No.: PCT/JP2017/026842
§ 371 (c)(1),
(2) Date: Jan. 23, 2019

(87) PCT Pub. No.: WO2018/021297
PCT Pub. Date: Feb. 1, 2018

(65) Prior Publication Data
US 2019/0281596 A1    Sep. 12, 2019

(30) Foreign Application Priority Data

Jul. 27, 2016    (JP) .............................. JP2016-147249

(51) Int. Cl.
*H04W 72/04*    (2009.01)
(52) U.S. Cl.
CPC ......... *H04W 72/048* (2013.01); *H04W 72/04* (2013.01)

(58) Field of Classification Search
CPC .... H04W 72/04; H04W 72/048; H04W 64/00
See application file for complete search history.

(56) References Cited

U.S. PATENT DOCUMENTS

| | | | | |
|---|---|---|---|---|
| 2013/0143624 | A1* | 6/2013 | Tsutsui | H04W 64/00 455/561 |
| 2013/0229931 | A1* | 9/2013 | Kim | H04L 5/0053 370/252 |
| 2016/0295624 | A1* | 10/2016 | Novlan | H04W 76/14 |
| 2016/0330728 | A1* | 11/2016 | Sorrentino | H04W 72/048 |
| 2017/0041916 | A1* | 2/2017 | Soret | H04W 8/005 |

(Continued)

OTHER PUBLICATIONS

PCT/JP2017/026842; Kyocera Corp.; English Translation of ISR; dated Oct. 17, 2017 (Year: 2017).*

(Continued)

*Primary Examiner* — Benjamin H Elliott, IV
(74) *Attorney, Agent, or Firm* — Studebaker & Brackett PC

(57) ABSTRACT

A communication device according to one embodiment comprise a transmitter configured to directly transmit a radio signal to another communication device. The transmitter is configured to transmit, when first location information indicating a geographical location of the communication device is acquired, the radio signal, based on a first radio resource associated with a location indicated by the first location information. The transmitter is configured to transmit, when the communication device cannot acquire the first location information, the radio signal, based on a second radio resource. The second radio resource is decided based on a method different from a method of deciding the first radio resource by using the first location information.

11 Claims, 16 Drawing Sheets

(56) References Cited

U.S. PATENT DOCUMENTS

| | | | | |
|---|---|---|---|---|
| 2017/0086081 | A1* | 3/2017 | Kim | H04W 4/40 |
| 2017/0295579 | A1* | 10/2017 | Sheng | H04W 64/00 |
| 2018/0234898 | A1* | 8/2018 | Kahtava | H04W 36/32 |
| 2019/0281596 | A1* | 9/2019 | Adachi | H04W 72/048 |

OTHER PUBLICATIONS

R1-162482; "Discussion on geolocation information reporting for V2V resource allocation"; LG; 3GPP TSG RAN WG1 Meeting #84bis R1-162482 Busan, Korea Apr. 11-15, 2016 (Year: 2016).*

R1-162733; "UE reporting of geo information"; Lenovo; 3GPP TSG RAN WG1 Meeting #84bis R1-162733 Busan, Korea, Apr. 11-15, 2016 (Year: 2016).*

R1-162820; "Reporting of UE Geo-Info for V2X to the eNB"; Ericsson; 3GPP TSG RAN WG1 Meeting #84bis R1-162820 Busan, Korea Apr. 11-15, 2016 (Year: 2016).*

R1-162933; "On combination of sensing and geo-based transmission techniques for sidelink V2V communication"; Intel; 3GPP TSG RAN WG1 Meeting #84bis R1-162933 Busan, Korea Apr. 11-15, 2016 (Year: 2016).*

R1-163137; "Discussion on V2V resource pool enhancement"; Beijing Xinwei Telecom Techn.; 3GPP TSG RAN WG1 Meeting #84bis R1-163137 Busan, Korea, Apr. 11-15, 2016 (Year: 2016).*

R1-163308; "Geo Based Resource Scheduling for V2V with Accurate Geographical Information"; General Motors; 3GPP TSG RAN WG1 Meeting #84bis R1-163308 Busan, Korea, Apr. 11-15, 2016 (Year: 2016).*

R1-164961; "Geo-based Resource Allocation for V2V"; ZTE; 3GPP TSG RAN WG1 Meeting #85 R1-164961 Nanjing, China May 23-27, 2016 (Year: 2016).*

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13), 3GPP TS 36.300 V13.4.0, Jun. 2016, pp. 1-310, Valbonne, France.

* cited by examiner

BUILDING CASE

OUT-OF-COVERAGE

IN-COVERAGE

COMMUNICATION DEVICE AND BASE STATION

TECHNICAL FIELD

The present disclosure relates to a communication device and a base station.

BACKGROUND ART

In 3GPP (3rd Generation Partnership Project) which is a project aiming to standardize a mobile communication system, specifications for signaling between terminals are being prepared (see Non Patent Document 1).

PRIOR ART DOCUMENT

Non-Patent Document

Non Patent Document 1: 3GPP Technical Specification "TS 36.300 V13.4.0", Jul. 7, 2016

SUMMARY

A communication device according to one embodiment comprise a transmitter configured to directly transmit a radio signal to another communication device. The transmitter is configured to transmit, when first location information indicating a geographical location of the communication device is acquired, the radio signal, based on a first radio resource associated with a location indicated by the first location information. The transmitter is configured to transmit, when the communication device cannot acquire the first location information, the radio signal, based on a second radio resource. The second radio resource is decided based on a method different from a method of deciding the first radio resource by using the first location information.

A base station according to one embodiment comprise a transmitter configured to transmit information of a first radio resource associated with a geographical location to a communication device. The information of the first radio resource is used to directly transmit a radio signal from the communication device to another communication device when first location information indicating a geographical location of the communication device is acquired. The transmitter is configured to transmit information of a second radio resource to the communication device. The information of the second radio resource is used to transmit the radio signal when first location information indicating the geographical location of the communication device cannot be acquired. The second radio resource is decided based on a method different from a method of deciding the first radio resource by using the first location information.

A communication device according to one embodiment comprises a controller configured to acquire location information indicating a geographical location of the communication device; and a transmitter configured to transmit a first report including the location information, to a base station. The transmitter is configured to stop transmitting the first report to the base station when an accuracy of the location information is less than a threshold value, even if transmission of the first report is triggered.

DESCRIPTION OF THE EMBODIMENT

Overview of Embodiment

Figure 1:
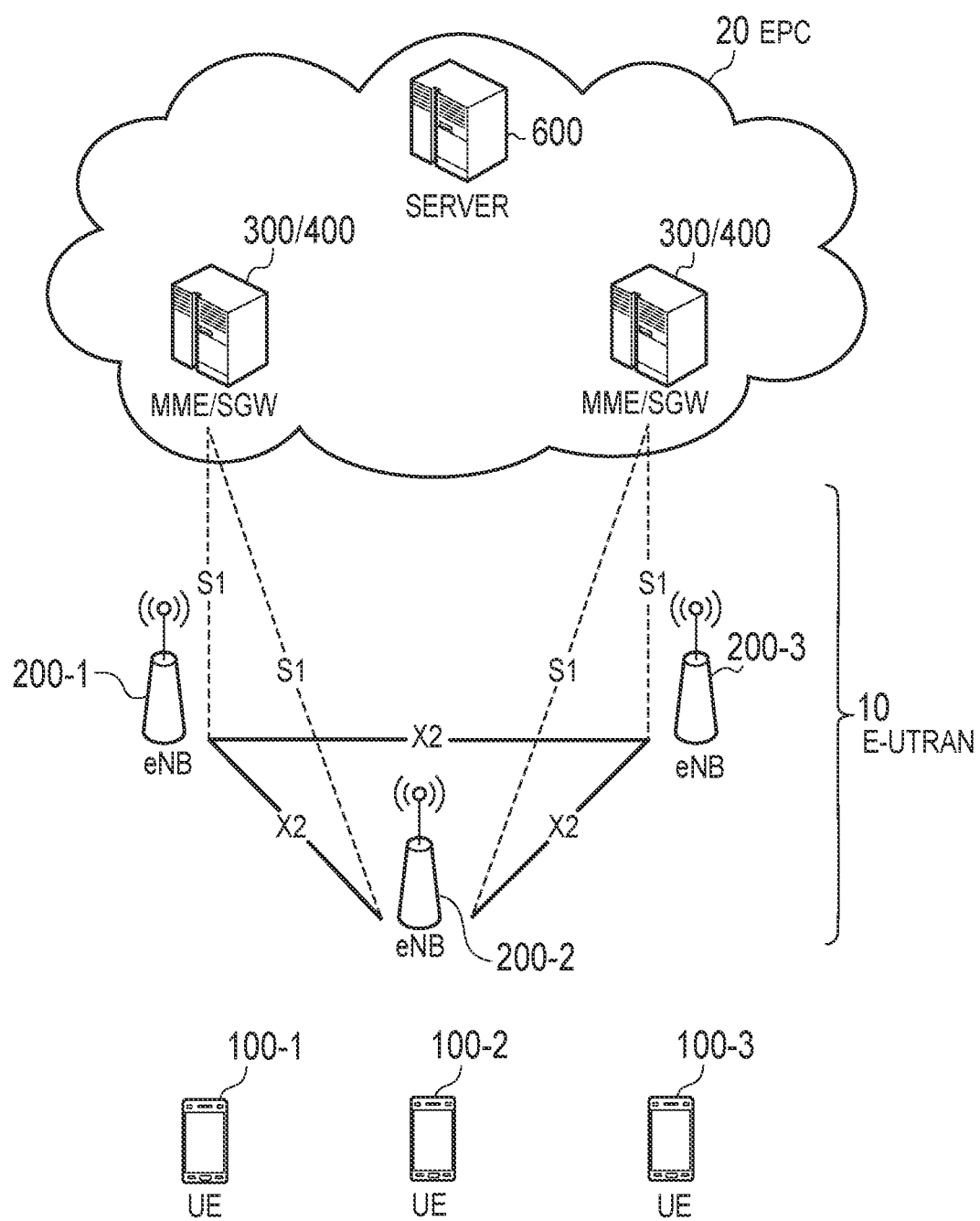
FIG. 1 is a diagram illustrating a configuration of an LTE system.

When a vehicle including a communication device executes a vehicle-to-vehicle (V2V) communication on a sidelink, for example, the use of a radio resource corresponding to the location of the vehicle has been discussed.

For example, a communication device included in a vehicle acquires location information indicating the actual location. It is assumed that the communication device transmits a radio signal on the sidelink based on a radio resource associated with the actual location.

However, a case is not assumed in which the communication device cannot acquire location information. For this reason, a problem may arise when a technology using the radio resource associated with the geographical location for V2V communication is introduced.

A communication device according to one embodiment comprise a transmitter configured to directly transmit a radio signal to another communication device. The transmitter is configured to transmit, when first location information indicating a geographical location of the communication device is acquired, the radio signal, based on a first radio resource associated with a location indicated by the first location information. The transmitter is configured to transmit, when the communication device cannot acquire the first location information, the radio signal, based on a second radio resource. The second radio resource is decided based on a method different from a method of deciding the first radio resource by using the first location information.

The second radio resource may be decided based on information of a radio resource available only when the first location information is not acquired.

The transmitter may transmit, to a network, information indicating that the communication device cannot acquire the first location information. The communication device may further comprise a receiver configured to receive information of the second radio resource decided by the network from the base station.

The communication device may further comprise a controller configured to estimate the geographical location of the communication device. The second radio resource may be decided based on the estimated location.

The transmitter may transmit the second location information to a network. The communication device may further comprise a receiver configured to receive information of the second radio resource decided by the network from the base station.

The communication device may further comprise a receiver configured to directly receive a second radio signal from another communication device; and a controller configured to decide the second radio resource based on a transmission resource used for transmitting the second radio signal based on predetermined information.

The communication device may further comprise a controller configured to store a use condition of the second radio resource. The transmitter may transmit the radio signal based on the second radio resource when the use condition is satisfied.

The use condition may be satisfied when a value corresponding to a reception state of the first location information in the communication device exceeds a threshold value.

The use condition may be satisfied when an accuracy of the first location information exceeds a threshold value.

A base station according to one embodiment comprise a transmitter configured to transmit information of a first radio resource associated with a geographical location to a communication device. The information of the first radio resource is used to directly transmit a radio signal from the communication device to another communication device when first information indicating a geographical location of the communication device is acquired. The transmitter is configured to transmit information of a second radio resource to the communication device. The information of the second radio resource is used to transmit the radio signal when first location information indicating the geographical location of the communication device cannot be acquired. The second radio resource is decided based on a method different from a method of deciding the first radio resource by using the first location information.

The transmitter may transmit the information of the second radio resource when the communication device enters an area where the first location information cannot be acquired.

The transmitter may transmit the information of the second radio resource to the communication device only when the communication device establishes a connection with the base station.

The second radio resource may be available only while the communication device establishes the connection with the base station.

A communication device according to one embodiment comprises a controller configured to acquire location information indicating a geographical location of the communication device; and a transmitter configured to transmit a first report including the location information, to a base station. The transmitter is configured to stop transmitting the first report to the base station when an accuracy of the location information is less than a threshold value, even if transmission of the first report is triggered.

The transmitter may transmit, when the accuracy of the location information is less than the threshold value, information indicating that the accuracy of the location information is less than the threshold value instead of the first report to the base station.

The controller may estimate the geographical location of the communication device. The transmitter may transmit a second report including second location information indicating the estimated location instead of the first report, to a base station when the accuracy of the location information is less than the threshold value.

The second report may include information indicating that the location information included in the second report indicates the estimated location.

In the present specification (and the claims), a "radio resource" may include a plurality of time/frequency resources (time resources and/or frequency resources). The "radio resource" may be a resource pool including a plurality of time/frequency resources.

(Mobile Communication System)

An LTE system, which is a mobile communication system according to an embodiment will be described. FIG. 1 is a diagram illustrating a configuration of the LTE system.

As illustrated in FIG. 1, the LTE system includes a UE (User Equipment) 100, an E-UTRAN (Evolved Universal Terrestrial Radio Access Network) 10, and an EPC (Evolved Packet Core) 20.

The UE 100 corresponds to a communication device (for example, a radio terminal). The UE 100 is a mobile communication device. The UE 100 may be a vehicle (VUE (Vehicle UE) 100) having a communication function. Therefore, the UE 100 may be the vehicle itself (for example, a car, a motorcycle, etc.). The UE 100 may be a communication module detachable from the vehicle.

The UE 100 performs radio communication (uplink/downlink) with a cell (eNB 200 described later). The UE 100 can execute direct signaling transmission and/or reception with another communication device. For example, the UE 100 can execute V2X (vehicle-to-everything) communication (such as vehicle-to-vehicle communication (V2V) and vehicle-to-infrastructure communication (V2I)).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400.

The MME 300 performs, for example, various kinds of mobility control for the UE 100. The SGW 400 performs, for example, data transfer control. The MME 300 and the SGW 400 are connected to the eNB 200 via a S1 interface.

The EPC 20 may include the Server 600. The Server 600 may be, for example, a ProSe server that manages the ProSe function. The Server 600 may be a V2X server that manages the V2X (V2V/V2I) function. The Server 600 may be provided in the external network, not in the EPC 20.

Figure 2:
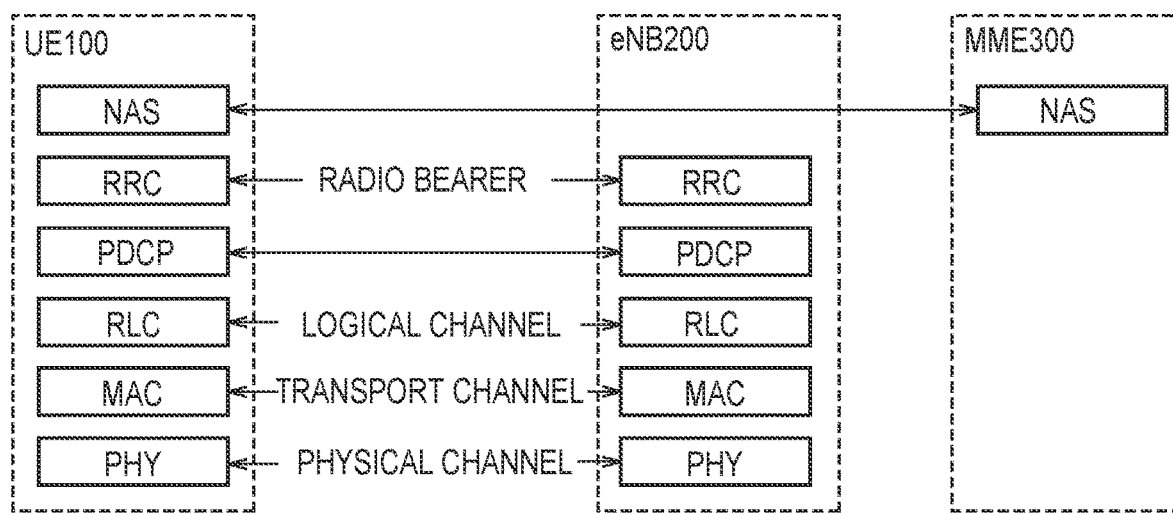
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
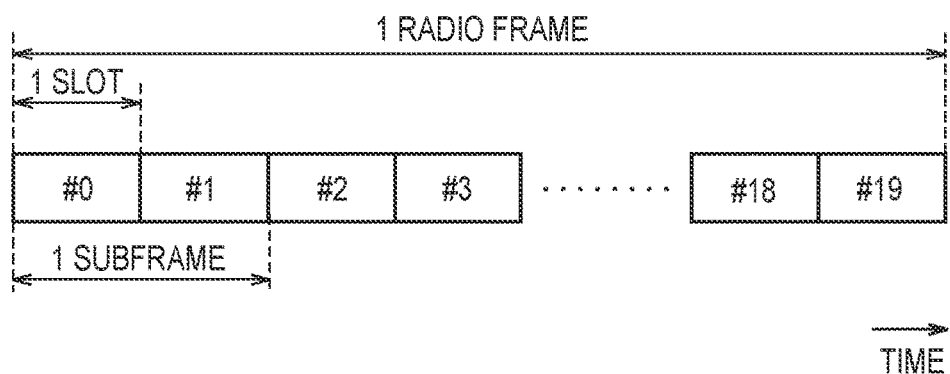
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Services)

Proximity-based services (ProSes) will be described. The proximity-based service is a service that can be provided by a 3GPP system, based on communication devices (for example, UEs 100) in the vicinity of each other.

In the ProSe, various types of radio signals are directly transmitted and received via a direct radio link between nodes (for example, between UEs), without passing through a network (for example, eNB 200). The direct radio link in the ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe-enabled UEs used for a control plane and a user plane for the ProSe direct discovery, the ProSe direct communication, and a ProSe UE-Network relay.

For modes of the ProSe, "direct discovery", "direct communication", and "relay" are defined. "Relay" will be described later.

The direct discovery may be, for example, a mode of searching for a destination by directly transmitting, between UEs, a discovery message (discovery signal) that does not specify a specific destination. The direct discovery may be a procedure for discovering another UE in the vicinity of a UE by using a direct radio signal in E-UTRA (Evolved Universal Terrestrial Radio Access) via the PC5. The direct discovery may be a procedure to be adopted by a UE 100 capable of executing the proximity-based service for discovering another UE 100 capable of executing the proximity-based service by using only a capability of the two UEs 100 with the help of the E-UTRA technology. The direct discovery may be supported only if the service is provided to the UE 100 by the E-UTRAN (eNB 200 (cell)). The service may be provided by the E-UTRAN if the UE 100 is either connected to the cell (eNB 200) or exits in the cell.

Resource allocation types for transmission (announcement) of a discovery message (discovery signal) include "Type 1" and "Type 2 (Type 2B)". In Type 1, the UE 100 selects a radio resource. In Type 1, the UE 100 may select a radio resource from resource pools provided by the eNB 200. In Type 2, the eNB 200 allocates a radio resource.

A "Sidelink Direct Discovery" protocol stack includes a physical (PHY) layer, a MAC layer, and the ProSe protocol.

The direct communication may be, for example, a mode in which data is directly transmitted between UEs by specifying a specific destination (destination group). The direct communication may be communication between two or more UEs capable of executing the proximity-based services through user plane transmission in which the E-UTRA technology is employed via a path without passing through any network node.

The resource allocation types of the direct communication include "Mode 1" and "Mode 2". In Mode 1, the eNB 200 specifies a radio resource of the direct communication. In Mode 2, in which the UE 100 selects a radio resource for the direct communication, the UE 100 may select a radio resource from among the resource pools provided from the eNB 200.

A protocol stack of the user plane in the sidelink communication (direct communication) in the PC 5 includes a physical (PHY) layer, a MAC layer, an RLC layer, and a PDCP layer. A protocol stack of the control plane for the sidelink broadcast control channel (SBCCH) in the PC 5 includes a physical (PHY) layer, a MAC layer, an RLC layer, and an RRC layer. A protocol stack of the control plane for one-to-one sidelink communication includes a physical (PHY) layer, a MAC layer, an RLC layer, a PDCP layer, and the PC5 signaling protocol.

In the sidelink, various types of information are transmitted by using the following channels.

Physical channels for sidelink include the Physical Sidelink Broadcast Channel (PSBCH), the Physical Sidelink Discovery Channel (PSDCH), the Physical Sidelink Control Channel (PSCCH), and the Physical Sidelink Shared Channel (PSSCH).

The PSBCH is a channel for transmitting information related to a system and synchronization (for example, synchronization signal). The PSDCH is a channel for transmitting a sidelink discovery message (discovery signal) from a UE. The PSCCH is a channel for transmitting control information from a UE for sidelink communication. The PSSCH is a channel for transmitting data from a UE for sidelink communication.

Transport channels for sidelink include the Sidelink Broadcast Channel (SL-BCH), the Sidelink Discovery Channel (SL-DCH), and the Sidelink Shared Channel (SL-SCH). The SL-BCH is mapped to the PSBCH. The SL-DCH is mapped to the PSDCH. The SL-SCH is mapped to the PSSCH.

Logical channels (control channel, traffic channel) for sidelink include the Sidelink Broadcast Control Channel (SBCCH) and the Sidelink Traffic Channel (STCH).

The SBCCH is a sidelink channel for broadcasting sidelink system information from one UE to another UE or other UEs. The STCH is a point-to-multipoint channel for transferring user information (data) from one UE to another UE or other UEs. The STCH is used only in UEs capable of the sidelink communication. The STCH may be used for point-to-point communication between two UEs capable of the sidelink communication. The STCH is mapped to the SL-SCH. The SBCCH is mapped to the SL-BCH.

(Radio Terminal)

Figure 4:
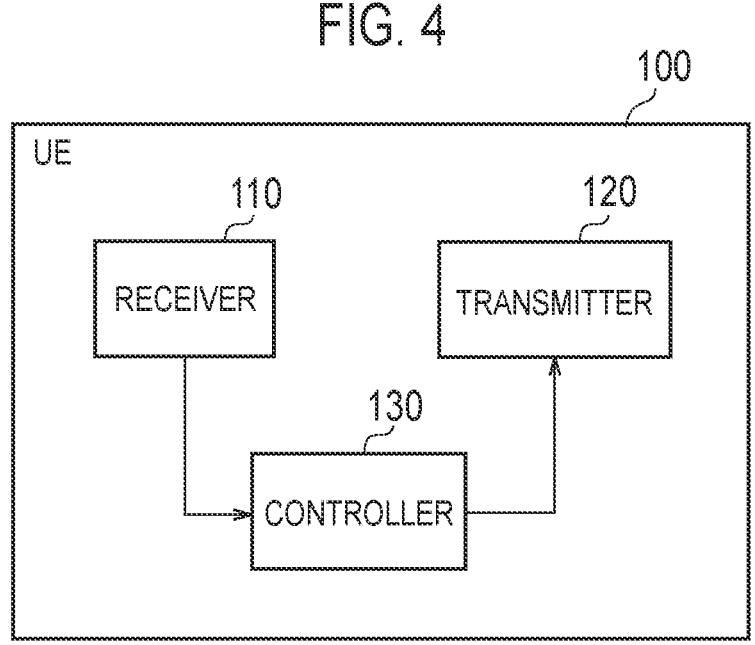
FIG. 4 is a block diagram of a UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100. The UE 100 may have a function of predicting location, such as an electronic compass and an acceleration sensor.

The UE 100 is a communication device having a function capable of executing transmission and/or reception of direct signaling with another communication device. Therefore, the UE 100 may have other configurations (for example, functions, members, etc.) as a matter of course.

For simplicity, a process executed by at least any one of the receiver 110, the transmitter 120, and the controller 130 included in the UE 100 is described herein as a process (operation) executed by the UE 100.

(Base Station)

Figure 5:
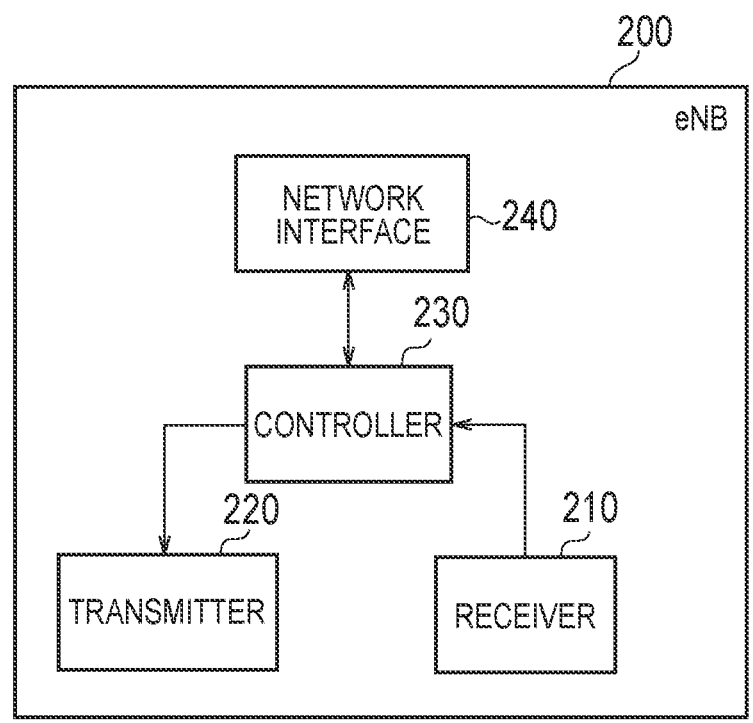
FIG. 5 is a block diagram of an eNB 200.

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

First Embodiment

Operation Overview According to First Embodiment

Figure 6:
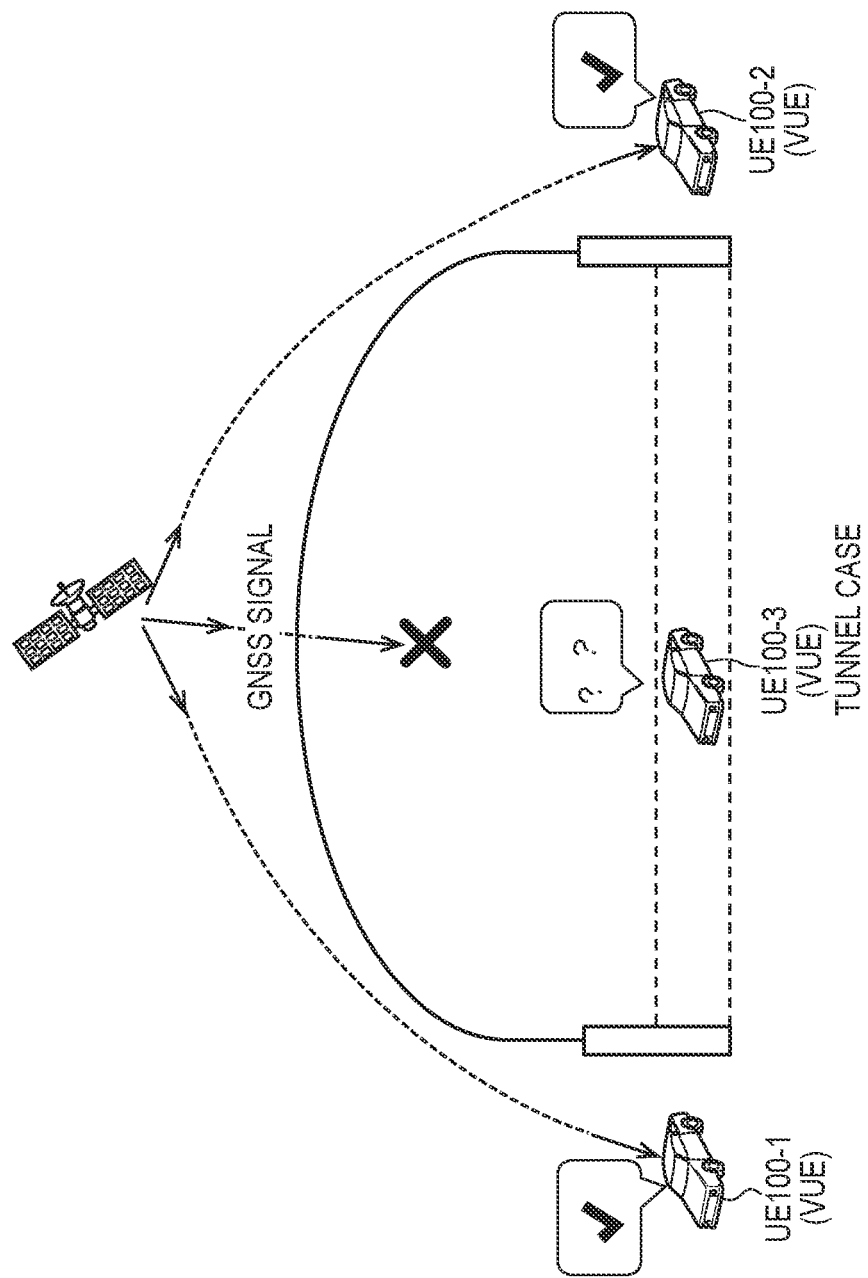
FIG. 6 is a diagram for describing an example of an operation environment according to a first embodiment.
Figure 7:
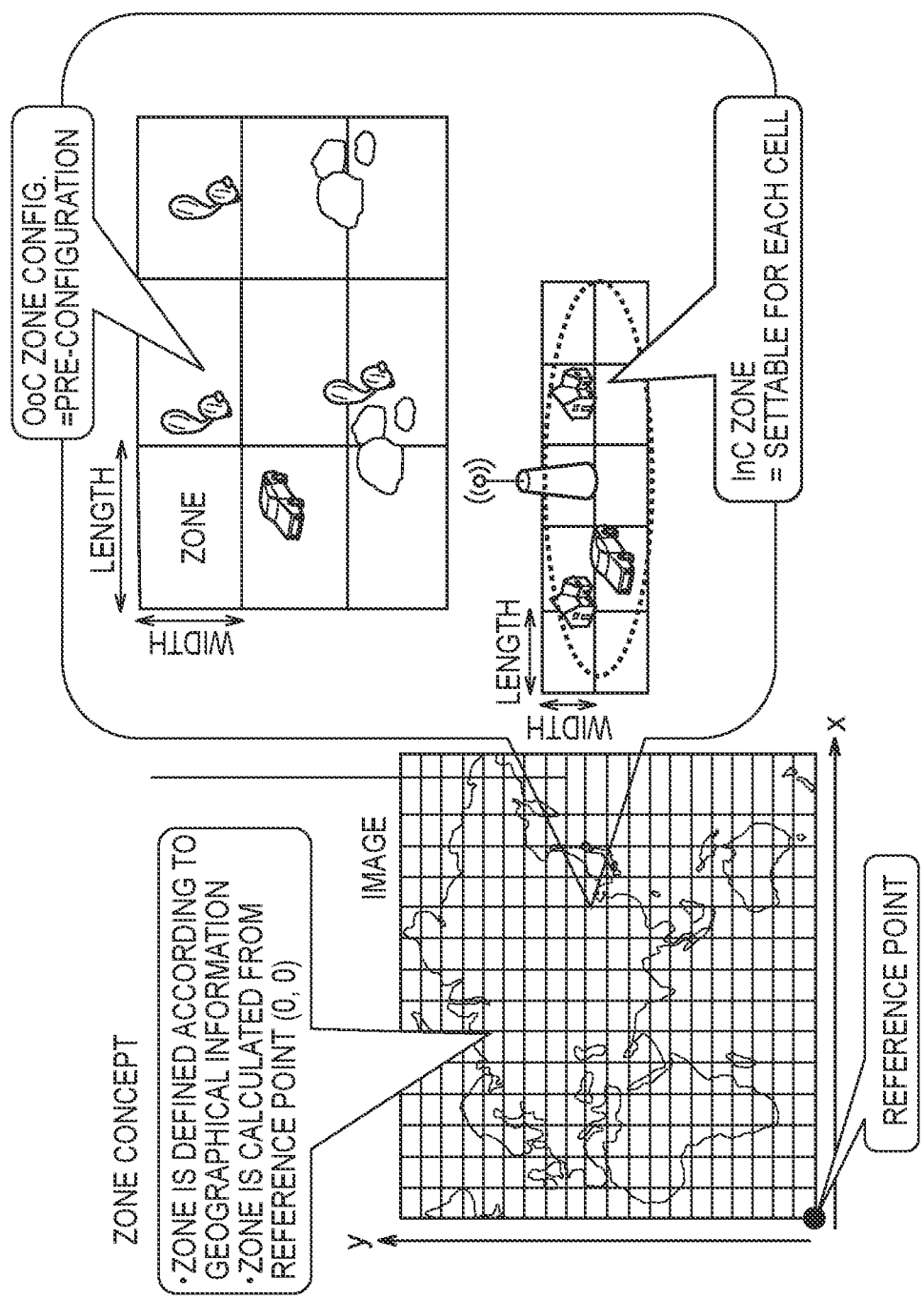
FIG. 7 is a diagram for describing an example of a radio resource according to the first embodiment.
Figure 8:
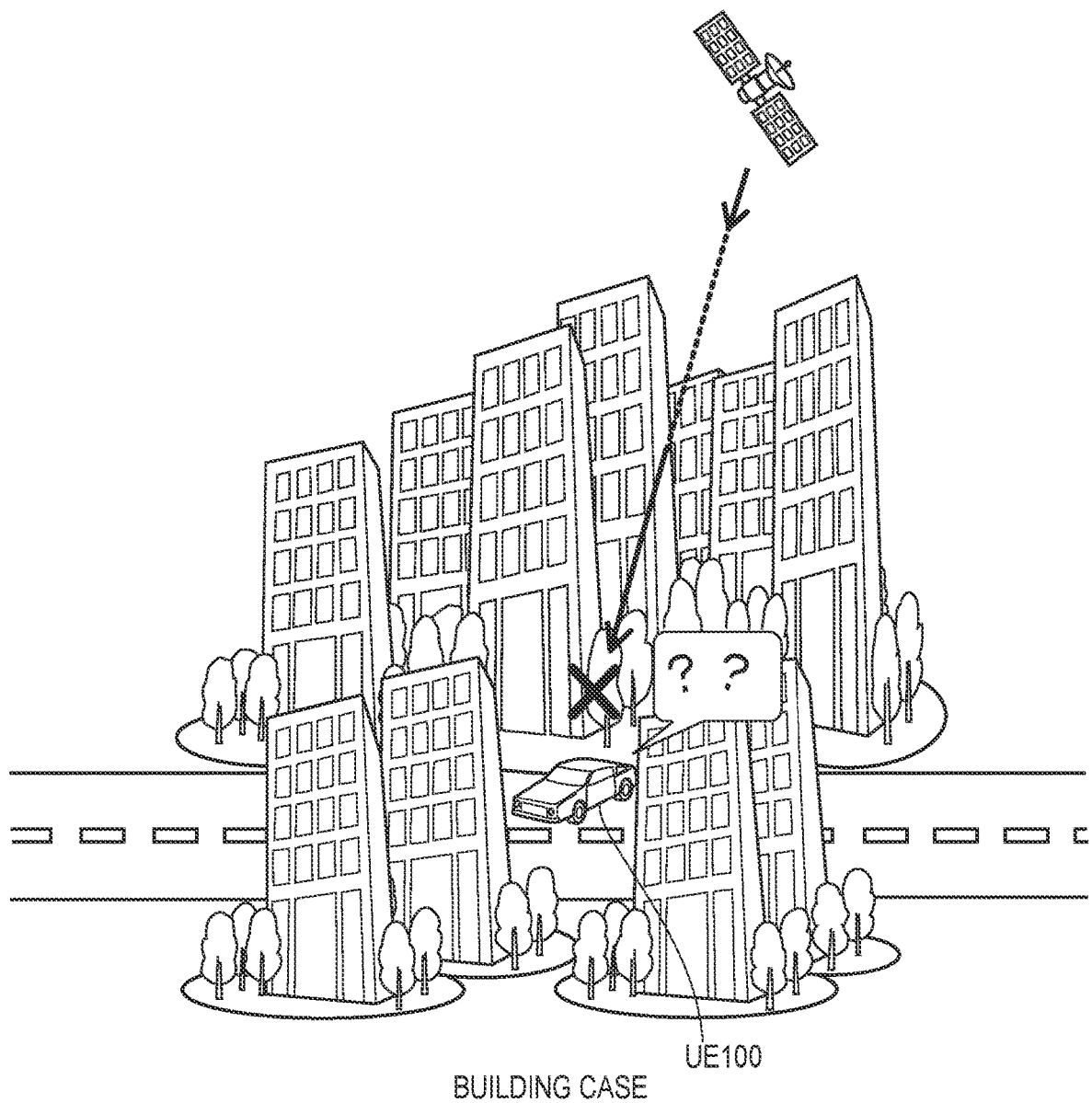
FIG. 8 is a diagram for describing an example of an operation environment according to the first embodiment.

An operation overview according to a first embodiment will be described with reference to FIG. 6 to FIG. 8. FIG. 6 is a diagram for describing an example of an operation environment according to the first embodiment. FIG. 7 is a diagram for describing an example of a radio resource according to the first embodiment. FIG. 8 is a diagram for describing an example of an operation environment according to the first embodiment.

As illustrated in FIG. 6, a UE (VUE) 100-1 (and a UE (VUE) 100-2) is located outside a tunnel. On the other hand, a UE (VUE) 100-3 is located inside the tunnel.

The UE 100-1 can acquire location information indicating the geographical location of the UE 100-1 by receiving a GNSS signal. The UE 100-1 can directly transmit a radio signal to another UE based on a radio resource associated with the acquired location information.

For example, as illustrated in FIG. 7, a geographical location (zone) partitioned based on a zone concept is associated with a radio resource. In the zone concept, zones are defined according to geographical information.

The network (for example, the eNB 200) may set different zones from zones defined in advance. The network may set zones for each cell. The eNB 200 may transmit the zone information (zone information defined in advance/zone information defined by the network) for determining (calculating) the zones to the UE 100-1 by broadcast (for example, an SIB message) or by unicast (for example, an RRC connection configuration (reconfiguration) message). The zone information may be set in advance (pre-configured) in the UE 100-1.

The zone information may include information indicating the length of the zone and the width of the zone. The zone information may include, for example, information indicating a reference point (for example, (0, 0)).

The UE 100-1 decides (calculates) the zone in which the UE 100-1 itself is located based on the zone information. Specifically, the UE 100 decides a zone including the actual location indicated by the acquired location information. The UE 100 may decide the zone from the reference point.

The UE 100-1 decides a radio resource associated with the determined zone (for example, the zone in which the UE 100-1 is located). Specifically, the UE 100-1 stores, for example, radio resource information in which a geographical location and a radio resource are associated with each other. In the radio resource information, a geographical location (set) and a radio resource (set) are mapped. The UE 100-1 decides a radio resource mapped to (associated with) the determined zone based on the radio resource information. The UE 100-1 determines that the determined radio resource is a radio resource usable in the zone in which the UE 100-1 is located.

The UE 100-1 can directly transmit a radio signal to another UE based on the determined radio resource. The UE 100-1 may select a time/frequency resource actually used for transmitting the radio signal from among the determined radio resources (resource pools). The UE 100-1 may directly transmit the radio signal to another UE by using the selected time/frequency resource.

The UE 100-1 may transmit information indicating the geographical location of the UE 100-1 to the eNB 200. Here, the location information may be the acquired location information (location information based on the GNSS signal). The location information may be information indicating the zone determined by the UE 100-1. The eNB 200 acquires the location information from the UE 100-1. The eNB 200 can decide the zone in which the UE 100-1 is located, based on the radio resource information in which the geographical location and the radio resource are associated with each other and the location information from the UE 100-1. The eNB 200 decides the radio resource (resource pool) associated with the determined zone. The location information may be transferred to an upper-level network device (for example, the server 600) of the eNB 200. That network device may decide the radio resource based on acquired location information. That network device may transmit information on the decided radio resource to the eNB 200.

The eNB 200 allocates the determined radio resource to the UE 100-1. The eNB 200 may decide a time/frequency resource to be allocated to the UE 100-1 from among the determined radio resources (resource pools). The eNB 200 may allocate the determined resource pool to the UE 100-1. The eNB 200 transmits allocation information indicating the allocated radio resource (time/frequency resource/resource pool) to the UE 100.

The UE 100 can directly transmit a radio signal to another UE based on the allocated radio resource (time/frequency resource/resource pool) indicated by the allocation information. As in the way described above, the UE 100-1 may select the time/frequency resource actually used for transmitting the radio signal from among the determined radio resources (resource pools).

In this way, when the radio resource associated with the geographical location is used in V2X (for example, V2V communication), it is assumed that the UE 100 can acquire the location information. On the other hand, even if the UE (VUE) 100 has the capability (for example, the GNSS receiver unit) to acquire the location information, it is not always possible to acquire the location information. For example, as illustrated in FIG. 6, since the UE 100-3 is located inside the tunnel, there is a possibility that the UE 100-3 cannot receive the GNSS signal. As illustrated in FIG. 8, when the UE 100 is located in an area where high-rise buildings are densely populated, there is a possibility that the UE 100 cannot receive the GNSS signal.

In this regard, even when the UE 100 cannot acquire the location information, it is possible to identify (decide) a radio resource to be used in the V2X communication in accordance with at least one of the following methods.

The "location information" is location information acquired by means defined for determining a geographical location associated with a radio resource. For example, the location information may be location information acquired by means different from the GNSS. For example, the location information may be location information acquired by means equivalent to the GNSS.

(1) Resource Identification Method

Operation patterns 1 to 3 will be described as resource identification methods.

(A) Operation Pattern 1

Figure 9:
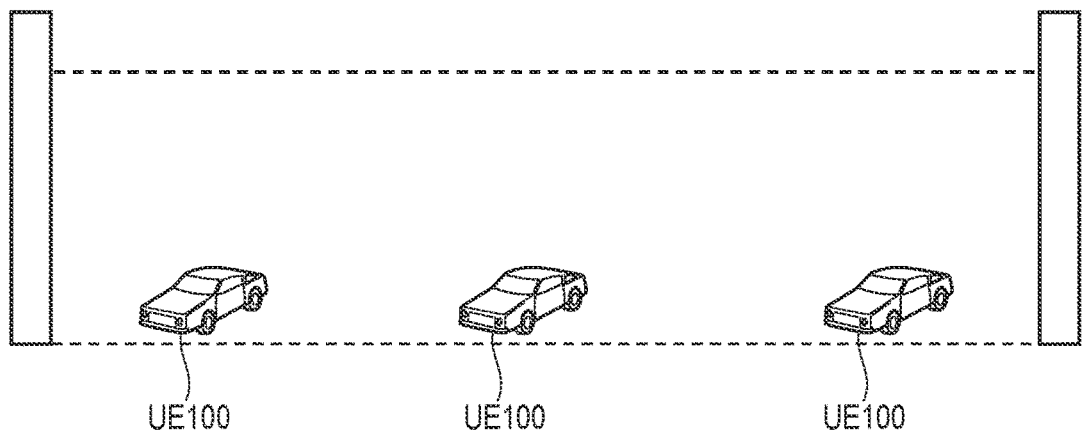
FIG. 9 is a diagram (part 1) for describing operation pattern 1.
Figure 10:
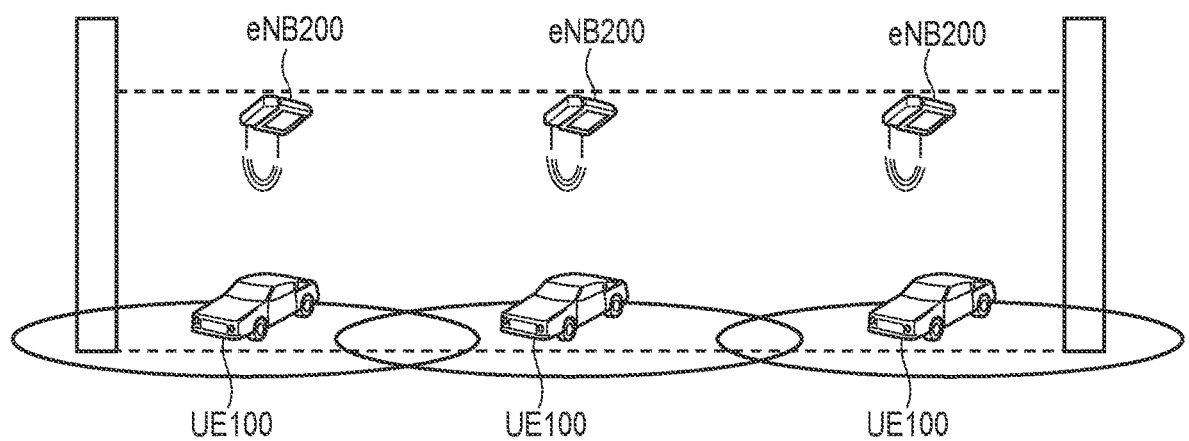
FIG. 10 is a diagram (part 2) for describing operation pattern 1.
Figure 11:
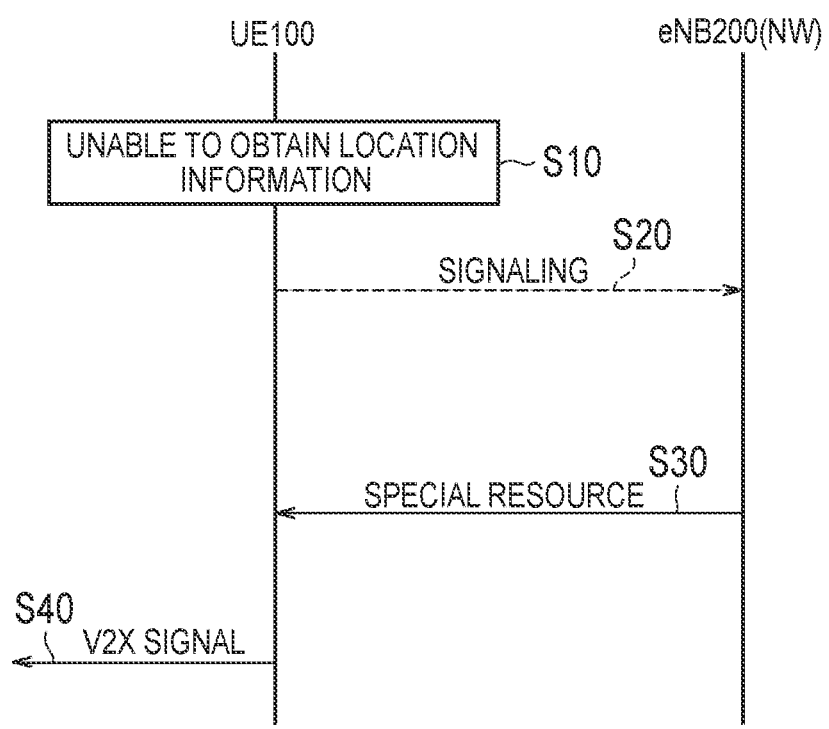
FIG. 11 is a sequence chart for describing operation pattern 1.

Operation pattern 1 will be described with reference to FIG. 9 to FIG. 11. FIG. 9 is a diagram (part 1) for describing operation pattern 1. FIG. 10 is a diagram (part 2) for describing operation pattern 1. FIG. 11 is a sequence chart for describing operation pattern 1.

In operation pattern 1, a radio resource (exceptional radio resource/special radio resource) available only when location information cannot be acquired is used.

FIG. 9 illustrates a case of out-of-coverage (Out of Coverage). The UE 100 is located inside the tunnel. For this reason, in the following explanation, it is assumed that the UE 100 cannot acquire the location information. Since the UE 100 is outside the coverage, the UE 100 cannot receive a radio signal from the eNB 200 (cell (serving cell/PCell (Primary Cell)).

In the case of out-of-coverage, when the UE 100 cannot acquire the location information of the UE 100 itself, the UE 100 directly transmits a radio signal by using a radio resource (hereinafter, appropriately referred to as a special radio resource) that is available only when the location information cannot be acquired. The information of the special radio resource may be set in advance in the UE 100. The network (for example, the eNB 200 (cell), the server 600, etc.) may transmit the information of the special radio resource to the UE 100 before the UE 100 goes out of the coverage. Accordingly, the special radio resource (information) may be set in the UE 100. As described later, the network may transmit the information of the special radio resource to the UE 100 when the UE 100 enters an area where the UE 100 cannot acquire the location information.

The special radio resource is a radio resource that is available only when the location information cannot be acquired. Therefore, the special radio resource does not have to be associated with a geographical location. That is, the special radio resource may be a radio resource available regardless of the location of the UE 100.

Only when the location information cannot be acquired, the UE 100 decides the special radio resource indicated by the information of the special radio resource as a radio resource to be used in V2X communication. The UE 100 can transmit a radio signal through V2X communication based on the special radio resource. Thus, even when the UE 100 cannot acquire the location information of the UE 100 itself outside the coverage, the UE 100 can transmit the radio signal through V2X communication. The UE 100 may select a time/frequency resource actually used for transmitting the radio signal from among special radio resources (resource pools).

FIG. 10 illustrates a case of in-coverage (In Coverage). As in FIG. 9, the UE 100 is located inside the tunnel. Therefore, the UE 100 cannot acquire the location information. On the other hand, the eNB 200 is installed in the tunnel. Therefore, the UE 100 can receive a radio signal from the eNB 200 (serving cell/PCell (Primary Cell)).

In the case of in-coverage, for example, as illustrated in FIG. 11, in step S10, the UE 100 determines that the location information cannot be acquired. The determination method will be described later (see "(2) Determination method").

In step S20, the UE 100 may transmit signaling to the eNB 200 in response to the location information being unable to be acquired.

In step S30, the eNB 200 transmits information of a special radio resource to the UE 100. The eNB 200 may transmit the information of the special radio resource (Special resources) to the UE 100 in response to the signaling from the UE 100.

In step S40, the UE 100 can transmit a radio signal (V2X signaling) through V2X communication based on the special radio resource.

When acquiring from the UE 100 information indicating that the location information of the UE 100 cannot be acquired by the signaling from the UE 100, the eNB 200 may individually transmit the information of a special radio resource to the same UE 100. The information indicating that the location information of the UE 100 cannot be acquired may indicate, for example, that the GNSS signal cannot be received. That information may indicate that the GNSS signal cannot be received despite the reception capability of the GNSS signal. That information may be transmitted to the eNB 200 (cell (serving cell/PCell)) by only a UE 100 having the reception capability of the GNSS signal. That information may be indicated by a blank in the field in which location information is to be stored in a message for reporting location information.

In the case of Mode 1 in which the eNB 200 allocates a radio resource to the UE 100, the information of the special radio resource may be allocation information indicating the radio resource allocated to the UE 100. In the case of Mode 2 in which the eNB 200 provides a resource pool to the UE 100, the information of the special radio resource may be allocation information indicating the resource pool allocated to the UE 100. The UE 100 can select a time/frequency resource actually used for transmitting the radio signal from among the allocated resource pools. If the eNB 200 determines that the UE 100 cannot acquire the location information, the eNB 200 decides, as a special radio resource, the radio resource to be allocated to the UE 100 for the V2X communication.

In the case of Mode 2, the eNB 200 may transmit the information of the special radio resource by broadcast. Thus, the UE 100, even in the idle mode, can acquire the information of the special radio resource. The UE 100 may determine that the use of the special radio resource is permitted by the eNB 200 when acquiring the information of the special radio resource. The eNB 200 may individually transmit use permission of the information of the special radio resource (for example, SL-grant) to the UE 100. For example, the eNB 200 may transmit the use permission to the UE 100 that has transmitted the information indicating that the location information of the UE 100 cannot be acquired. The use permission may be permission to use information of a special radio resource previously set (preconfigured). Even when the UE 100 is in the coverage, the UE 100 may use the special radio resource previously set (preconfigured) in response to receiving the use permission from the eNB 200.

The eNB 200 may transmit the information of the special radio resource to the UE 100 only when the UE 100 establishes a connection (RRC connection) with the eNB 200. That is, the eNB 200 may provide the information of the special radio resource only to the UE 100 that is in the RRC connected mode. Therefore, the eNB 200 does not have to broadcast the information of the special radio resource. This may cause the eNB 200 to request the V2X communication in the RRC connected mode. When the eNB 200 establishes an RRC connection, the special radio resource (resource pool) allocated to the UE 100 may be available only while the UE 100 establishes the RRC connection with the eNB 200.

If the information of the special radio resource is not broadcasted, the UE 100 may determine that a special radio resource is available only in the RRC connected mode. As a result, the UE 100 in the idle mode (RRC idle mode) that the eNB 200 cannot sufficiently control, cannot use the special radio resource, and thus it is possible to avoid collision and interference of radio signals in the V2X communication due to the use of the special radio resource. If the UE 100 is interested in V2X communication and cannot acquire the location information, the UE 100 may transit to the RRC connected mode. That is, the UE 100 may start a procedure for establishing an RRC connection with the eNB 200. The UE 100 in the RRC connected mode may request the eNB 200 for the information of the special radio resource. For example, the UE 100 may transmit, to the eNB 200, a sidelink UE information message that includes information indicating an interest in (transmission/reception of) the special radio resource or information indicating a request for (transmission/reception of) the special radio resource. The eNB 200 may transmit the information of the special radio resource to the UE 100 in response to receiving the message.

In Mode 2, even when receiving the information of the special radio resource from the eNB 200, the UE 100 may determine whether or not the special radio resource can be used. Only when the location information cannot be acquired, the UE 100 can determine that the special radio resource can be used.

Although the eNB 200 is exemplified, a network (for example, an upper layer, the server 600, etc.) may execute the operation of the eNB 200. Specifically, the network may decide whether or not to transmit the information of the special radio resource to the UE 100. The eNB 200 may transfer at least part of the information included in the signaling from the UE 100 (for example, information indicating that the location information of the UE 100 cannot be acquired) to the network. The network may decide a special radio resource as a radio resource to be used in the V2X communication based on the transferred information.

(B) Operation Pattern 2

Figure 12:
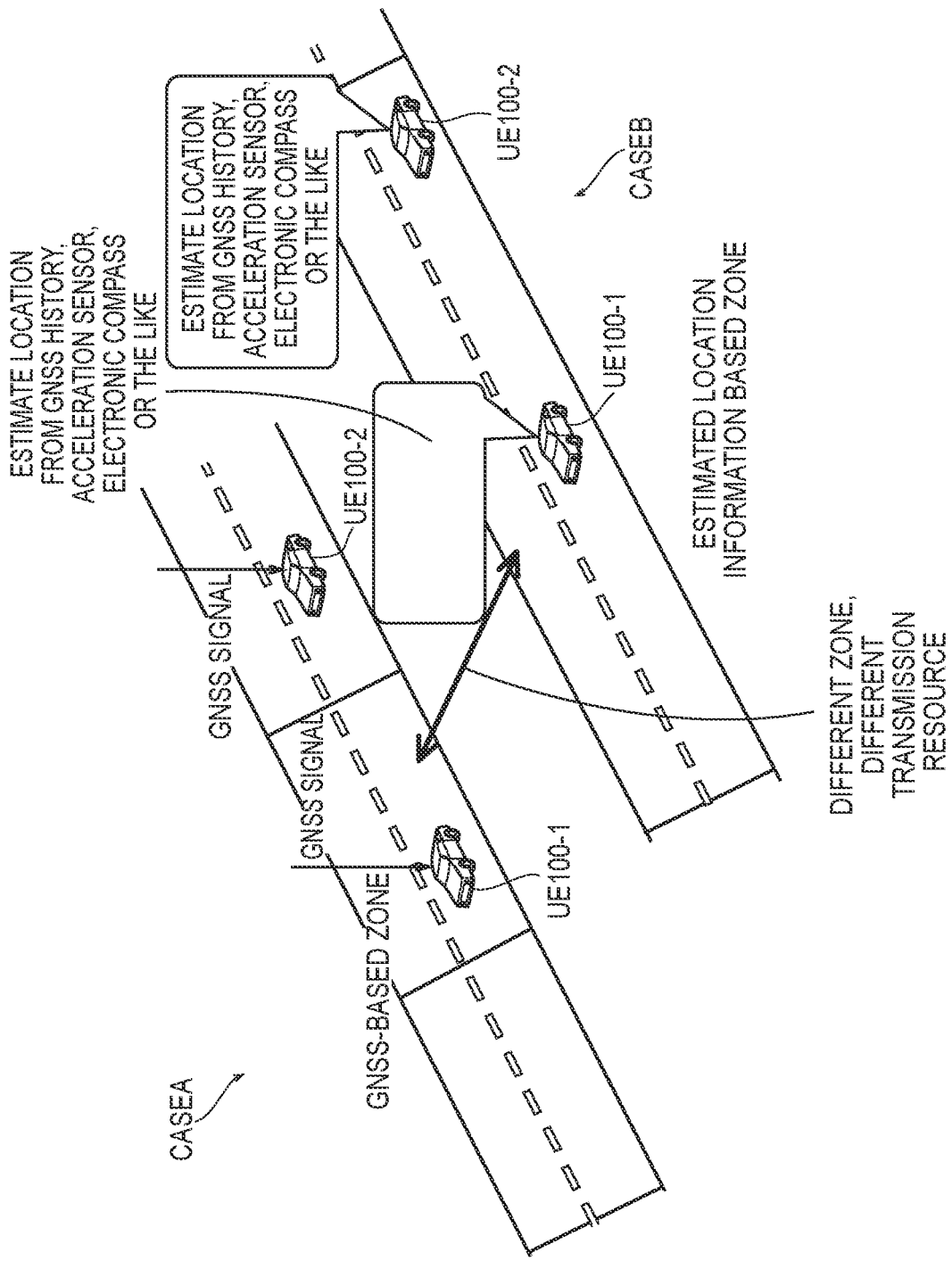
FIG. 12 is a diagram for describing operation pattern 2.
Figure 13:
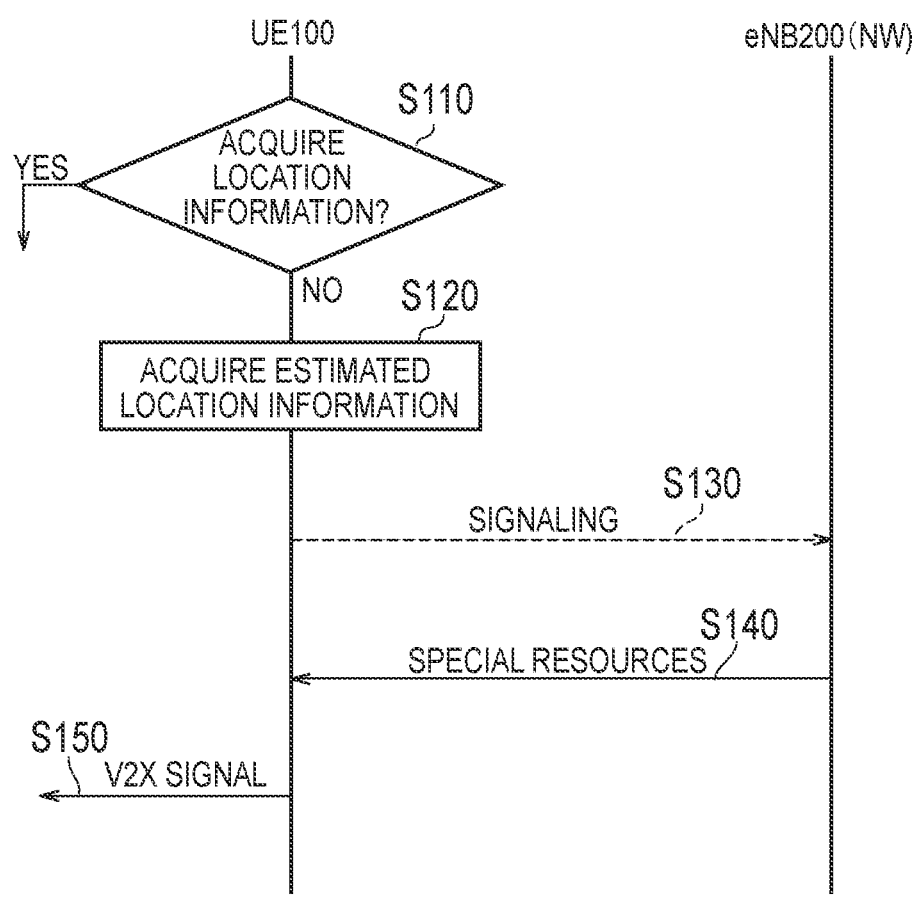
FIG. 13 is a sequence chart for describing operation pattern 2.

Operation pattern 2 will be described with reference to FIG. 12 and FIG. 13. FIG. 12 is a diagram for describing operation pattern 2. FIG. 13 is a sequence chart for describing operation pattern 2.

In operation pattern 2, a radio resource to be used by the UE 100 for V2X is decided based on an estimated geographical location of the UE 100.

Case A in FIG. 12 is a case where the UE 100 (UE 100-1, UE 100-2) can acquire the location information. On the other hand, Case B in FIG. 12 is a case where the UE 100 cannot acquire the location information.

For example, when the UE 100 cannot acquire the location information by the GNSS, the UE 100 estimates the geographical location of the UE 100 itself, for example, by using a location estimation function (location estimation device) or the like. Here, the location estimation function indicates a function of identifying the location of the UE 100 by different means from the GNSS and location identifying means equivalent to the GNSS. The location estimation function is, for example, an electronic compass, an acceleration sensor, or the like. The UE 100 may use GNSS logs to predict the present geographical location of the UE 100 itself. For example, the UE 100 may predict the location based on the last received location information.

In the case of out-of-coverage, the UE 100 decides a radio resource for transmitting a direct radio signal based on estimated location information indicating the estimated geographical location of the UE 100 itself. The UE 100 may decide the radio resource based on the estimated location information only when the UE 100 has previously received permission from the eNB 200.

The UE 100 can decide, from among setting resources ((plural) radio resources/(plural) resource pools) for X2X that are set in advance, a resource (time/frequency resource/resource pool) actually used for transmitting a radio signal.

As with the radio resources (normal resources) available when the location information can be acquired, the setting resources are associated with (mapped to) zones (geographical locations). Therefore, the UE 100 can decide a use resource by regarding the estimated location information as the location information used for determining the use resource (resource pool).

The setting resources may be normal resources itself. The setting resources (radio resources that are available when the location information cannot be acquired) may be radio resources different from the normal resources (radio resources that are available when the location information can be acquired). That is, the setting resources may be separated from the normal resources. In this case, while the setting resources are associated with (mapped to) the zones (geographical locations), the setting resources may be associated so as to be different from the normal resources. For example, the zones to be associated with the setting resources may be partitioned larger than the zones associated with the normal resources. For example, it is assumed that the UE 100-1 and the UE 100-2 are at the same locations in Case A and Case B in FIG. 12. While the UE 100-1 and the UE 100-2 are located in different zones (Case A in FIG. 12) when the location information can be acquired, the UE 100-1 and the UE 100-2 may be located in the same zone (Case B in FIG. 12) when the location information cannot be acquired.

The UE 100 can transmit a direct radio signal based on the radio resource (resource pool) determined by the estimated location information. As in the way described above, the UE 100-1 may select the time/frequency resource actually used for transmitting the radio signal from among the determined radio resources (resource pools).

Thus, the UE 100 can use the radio resources associated with the zones by using the estimated location information. Meanwhile, even when the accuracy of the estimated location information is low, the separation of the setting resources from the normal resources makes it possible to reduce collision and interference of radio signals.

For example, the estimated location information may be location information with low accuracy among location information based on the GNSS.

In the case of in-coverage, for example, as illustrated in FIG. 13, in step S110, the UE 100 determines whether the location information has been acquired. If the UE 100 determines that the location information has been acquired, the UE 100 transmits the location information to the eNB 200. Based on the location information, the eNB 200 allocates a radio resource (resource pool) corresponding to the geographical location of the UE 100 to the UE 100. On the other hand, if the UE 100 determines that the location information cannot be acquired, the UE 100 can execute the process of step S120.

In step S120, the UE 100 acquires the estimated location information.

In step S130, the UE 100 may transmit the acquired estimated location information to the eNB 200 (network). The UE 100 may transmit information indicating the zone identified by the estimated location information to the eNB 200. In this case, the UE 100 can present to the eNB 200 the zone being based on the estimated location information. The eNB 200 allocates a radio resource (resource pool) corresponding to the zone including the location indicated by the estimated location information to the UE 100. The eNB 200 may decide the radio resource (resource pool) to be allocated to the UE 100 from among radio resources (resource pools) associated with different zones from the zones associated with normal location information (for example, location information based on the GNSS). That is, the radio resource to be allocated in this case may be a resource arranged in an area different from the normal resource.

In step S140, the eNB 200 transmits the allocated radio resource (resource pool) to the UE 100.

Step S150 is similar to step S40.

In the case of Mode 2, the eNB 200 may broadcast information on available resource pools based on the estimated location information, for the UE 100 that is in the idle mode. Thus, the UE 100 can decide the resource pool to be used based on the estimated location information even when the UE 100 is in the idle mode. The eNB 200 may individually transmit use permission of information of that resource pool (for example, SL-grant) to the UE 100. The eNB 200 may individually transmit the use permission to the UE 100 by signaling (for example, see step S20 and step S130) from the UE 100.

Although the eNB 200 is exemplified, as described above, a network (for example, an upper layer, the server 600) may execute the operation of the eNB 200.

(C) Operation Pattern 3

Figure 14:
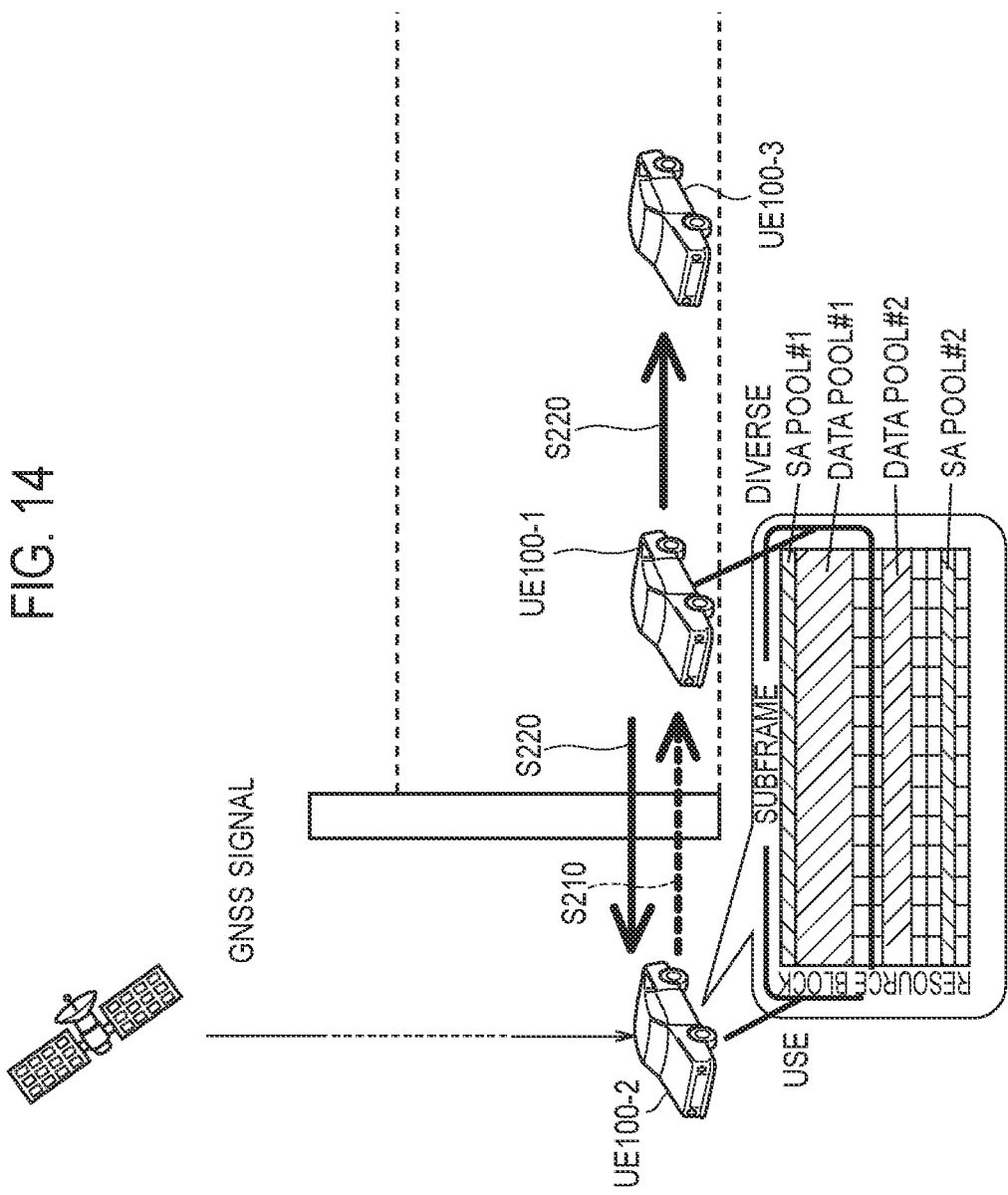
FIG. 14 is a diagram for describing operation pattern 3.

Operation pattern 3 will be described with reference to FIG. 14. FIG. 14 is a diagram for describing operation pattern 3.

In operation pattern 3, the UE 100 itself decides the radio resource to be used based on a transmission resource used by another UE.

In FIG. 14, a UE 100-1 (and UE 100-3) is located inside a tunnel. The UE 100-1 cannot acquire the location information. On the other hand, a UE 100-2 is located outside the tunnel. The UE 100-2 can acquire the location information. The UE 100-1 transmits a radio signal through V2X communication based on the radio resource (resource pool) determined based on the acquired location information (S210).

The UE 100-1 directly receives the radio signal from the UE 100-2 through the V2X communication. The UE 100-1 may restrict the time/frequency region (search space) in which reception of the radio signal through the V2X communication is attempted, based on the information of the radio resource stored in the UE 100-1.

The UE 100-1 decides a transmission resource pool to be used by the UE 100-1 in the V2X communication, based on the transmission resource (that is, the time/frequency region in which the radio signal was successfully received) used for the transmission of the radio signal. Specifically, the UE 100-1 regards the transmission resource pool including the used transmission resource as the transmission resource pool to be used, based on the information of the stored radio resource. That is, the UE 100-1 diverts the transmission resource pool used by the UE 100-2. The UE 100-1 may identify a zone associated with the transmission resource pool. The UE 100-1 may decide, as the radio resource (resource pool) to be used, a radio resource (resource pool) associated with the identified zone, based on the information of the radio resource.

In step S220, the UE 100-1 can select a time/frequency resource actually used for the transmission of the radio signal from among the determined transmission resource pools. The UE 100-1 directly transmits a radio signal through the V2X communication by using the selected time/frequency resource. In this way, even when the UE 100-1 cannot acquire the location information, the UE 100-1 can decide the transmission resource pool if the UE 100-2 to which the radio signal is directly transmitted exists.

The UE 100-2 decides, as radio resources to be used, an SA (Scheduling Assignment) pool (SA Pool #1) and a data pool (Data Pool #1) based on the location information. The UE 100-1 decides a control resource to be used from SA Pool #1. The UE 100-1 decides a data resource to be used from Data Pool #1. The UE 100-2 transmits control information by using the radio resources in SA Pool #1. The control information includes information indicating the location of data (data resource) to be transmitted by the UE 100-2. After transmitting the control information, the UE 100-2 transmits the data by using the data resource indicated by the control information. On the other hand, the UE 100-1 directly receives the control information from the UE 100-2. The UE 100-1 directly receives the data from the UE 100-2 by using the data resource indicated by the control information. This operation may be executed in this specification when the UE 100 performs the V2X communication.

The UE 100-2 may execute the operation of operation pattern 2 when the UE 100-2 is located outside the cell coverage. The UE 100-2 may execute the operation of operation pattern 2 when the UE 100-2 is located in the cell coverage. In this case, the UE 100-2 may execute the operation of operation pattern 2 only when the UE 100-2 receives permission from the eNB 200.

The UE 100-1 may include, in the control information and/or the data, information indicating that the radio resource identified based on the location information is used. Only when that information is included, the UE 100-2 may divert the transmission resource pool. The UE 100-1 may include, in the control information and/or the data, the location information of the UE 100-1 itself (information indicating the acquired location information and/or zone). Only when that information is included, the UE 100-2 may divert the transmission resource pool.

The UE 100-2 may include, in the control information and/or the data, information indicating that the transmission resource pool is diverted. When that information is included, the UE 100-3 itself does not have to divert the transmission resource pool. The UE 100-2 may include, in the control information and/or the data, information indicating how many times the transmission resource pool is diverted. When the number of times exceeds a threshold value, the UE 100-3 does not have to divert the transmission resource pool.

(2) Determination Method

Figure 15:
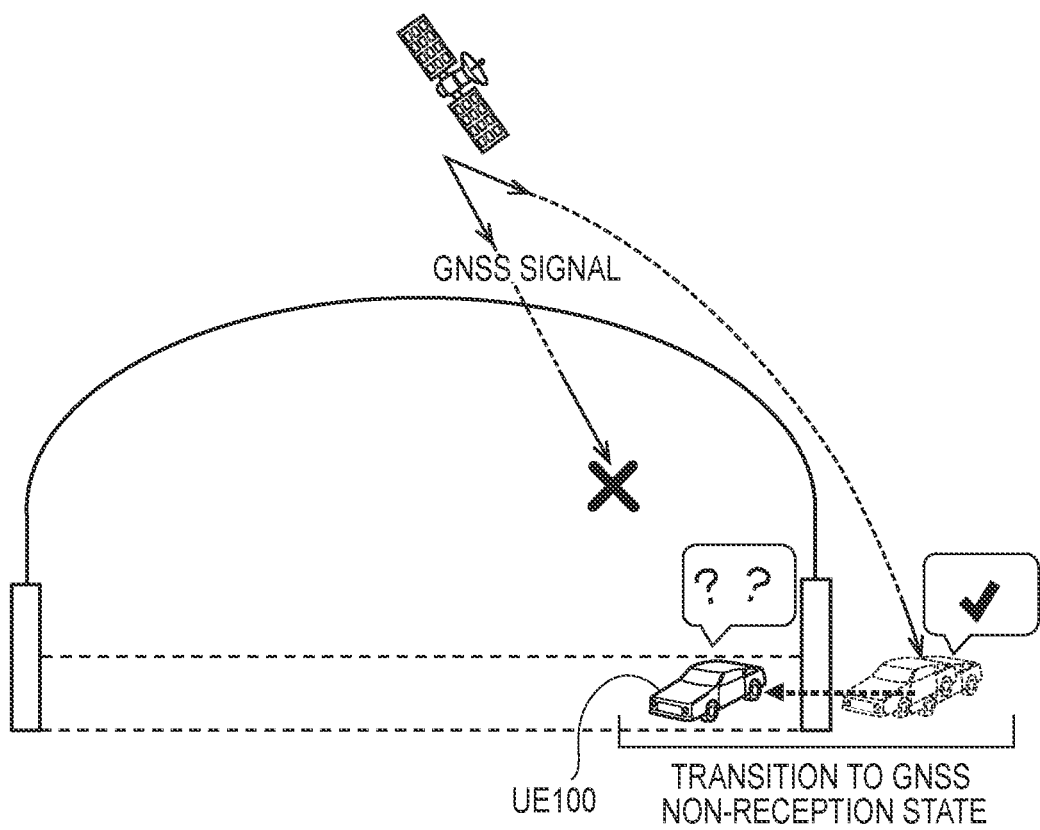
FIG. 15 is a diagram (part 1) for describing a determination method.
Figure 16:
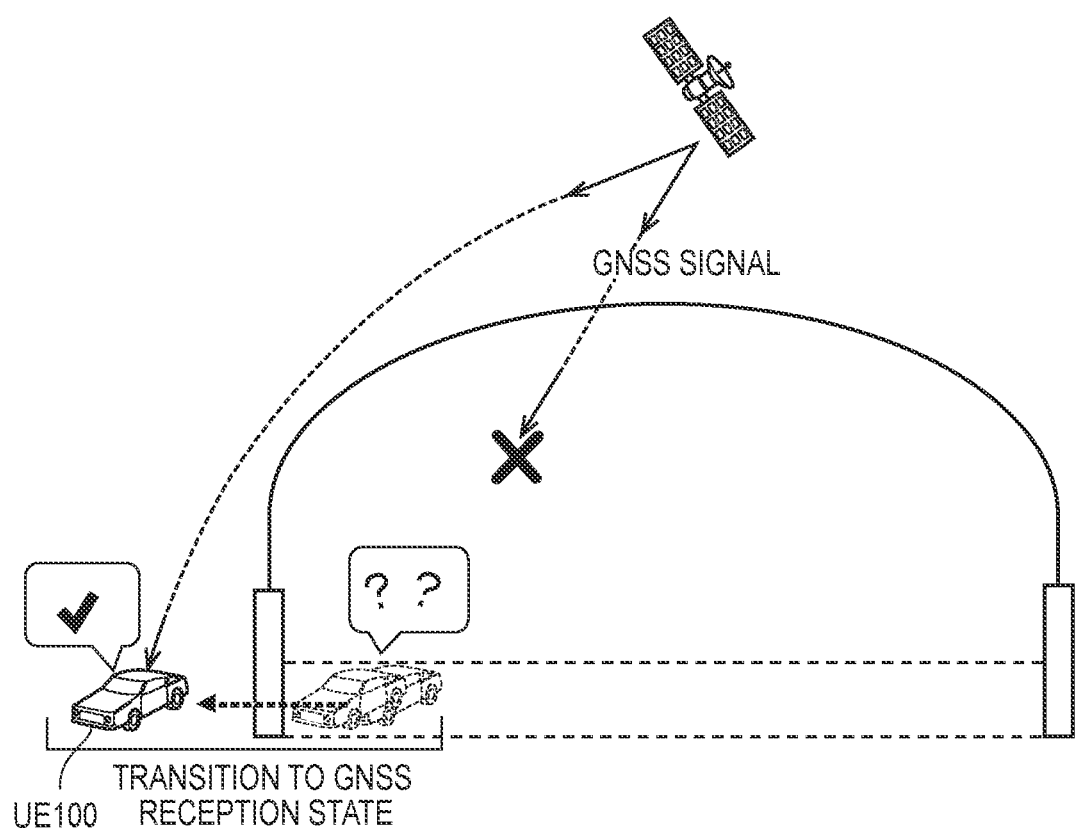
FIG. 16 is a diagram (part 2) for describing a determination method.
Figure 17:
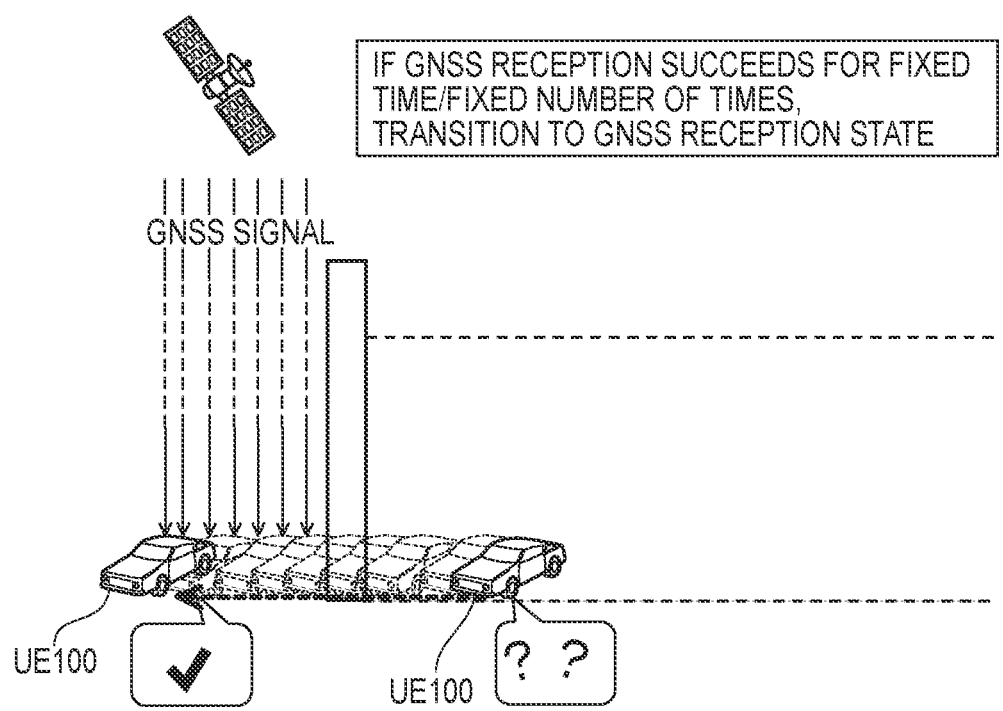
FIG. 17 is a diagram (part 3) for describing a determination method.

A determination method will be described with reference to FIGS. 15 to 17. FIG. 15 is a diagram (part 1) for describing the determination method. FIG. 16 is a diagram (part 2) for describing the determination method. FIG. 17 is a diagram (part 3) for describing the determination method.

The UE 100 determines whether or not at least one of operation patterns 1 to 3 described above can be executed by at least one of the following methods. That is, the UE 100-1 determines that the location information cannot be acquired.

The UE 100 may store the use conditions of radio resources (hereinafter, appropriately referred to as special radio resources) used in operation patterns 1 to 3. When the use conditions are satisfied, the UE 100 may determine that at least one of the above-described operation patterns 1 to 3 can be executed. When the use conditions are not satisfied, the UE 100 may determine that the normal resources available when the location information can be acquired are usable.

The use conditions may be set in advance in the UE 100. The eNB 200 (cell) may transmit information indicating the use conditions by broadcast (for example, an SIB message) or by unicast (for example, an RRC connection configuration (reconfiguration) message). The eNB 200 may transmit the use conditions to the UE 100 together with the special radio resource. For example, the information indicating the use conditions may include information of a threshold value described later. The use conditions may be provided from a network (for example, an MME, an upper layer, the server 600, etc.) (for example, by NAS signaling).

When transitioning to a state in which the use conditions are satisfied, the UE 100 may change the information of the special radio resource to activated. Only when the UE 100 is activated, the special radio resource may be usable. On the other hand, when transitioning from the state in which the use conditions are satisfied to a state in which the use conditions are not satisfied, the UE 100 may change the information of the special radio resource from activated to deactivated. When transitioning from the state in which the use conditions are satisfied to the state in which the use conditions are not satisfied, the UE 100 may discard (or release) the information of the special radio resource.

First, the UE 100 performs the determination according to the reception state of the GNSS signal.

As illustrated in FIG. 15, the UE 100 moves from the outside of the tunnel to the inside of the tunnel. As a result, the UE 100 comes to the state of being unable to receive the GNSS signal. When the UE 100 cannot receive the GNSS signal, the UE 100 determines that the location information cannot be acquired. On the other hand, as illustrated in FIG. 16, the UE 100 moves from the inside of the tunnel to the outside of the tunnel. As a result, the UE 100 comes to the state of being able to receive the GNSS signal. When receiving the GNSS signal, the UE 100 determines that the location information can be acquired.

When the reception time of the GNSS signal exceeds a threshold value, the UE 100 may determine that the location information has been acquired. Otherwise, the UE 100 may determine that the location information cannot be acquired. Even if the UE 100 has received the GNSS signal once or several times, when the reception time of the GNSS signal does not exceed the threshold value, the UE 100 may determine that the location information cannot be acquired.

As illustrated in FIG. 17, when the GNSS signal is continuously succeeded for a fixed time, the UE 100 may determine that the location information has been acquired. That is, when the continuous reception time of the GNSS signal exceeds a threshold value, the UE 100 may determine that the location information has been acquired. In this case, the UE 100 may transition to a GNSS reception state. When the UE 100 is in the GNSS reception state, the special radio resource (that is, the use conditions may be satisfied) may be usable for the UE 100. When the continuous reception time of the GNSS signal does not satisfy the threshold value, the UE 100 may determine that the location information cannot be acquired (no GNSS reception state). When the reception time per unit time exceeds a threshold value, the UE 100 may determine that the location information has been acquired. Otherwise, the UE 100 may determine that the location information cannot be acquired.

As illustrated in FIG. 17, when the reception of the GNSS signal is continuously succeeded, the UE 100 may determine that the location information has been acquired. That is, when the number of consecutive reception times of the GNSS signal exceeds a threshold value, the UE 100 may determine that the location information has been acquired. When the number of consecutive reception times of the GNSS signal does not satisfy the threshold value, the UE 100 may determine that the location information cannot be acquired. When the number of times of reception per unit time exceeds a threshold value, the UE 100 may determine that the location information has been acquired. Otherwise, the UE 100 may determine that the location information cannot be acquired.

In this way, when the value corresponding to the reception status of the GNSS signal (location information) exceeds the threshold value, the UE 100 determines that the use conditions are satisfied. Accordingly, for example, when a plurality of tunnels are continuous at short intervals, it is possible to reduce frequent changes of the radio resource to be used.

The UE 100 may execute the above-described determination depending on the reception state of other signals used by the UE 100 to identify its location.

Second, the UE 100 performs the determination according to the accuracy of the location information.

For example, even if the UE 100 has received (successfully receives) the GNSS signal, only when the accuracy of the location information exceeds a threshold value (or is equal to or more than the threshold value), the UE 100 may determine that the location information has been acquired. When the accuracy of the location information is less than the threshold value (or equal to or less than the threshold value), the UE 100 may determine that the location information cannot be acquired.

The UE 100 may perform the determination based on a value indicating uncertainty of the location information (for example, longitude and latitude). For example, the uncertainty can be calculated according to the following equation.

$$r = C((1+x)^K - 1) \qquad \text{[Math. 1]}$$

r is a value (m) indicating the uncertainty (error distance) from the calculated actual location.

C is a value indicating confidence. C is a value of parameter used for calculating an error. The larger the value of C, the greater the error.

x and K are predetermined values. For example, C=10, x=0.1, and K is a value that satisfies the following range.

$$0 \leq K \leq 127 \qquad \text{[Math. 2]}$$

The threshold value may be a value (error distance) to be compared with r. The threshold value may be a value to be compared with K.

The relationship between K and r is shown by the following table, for example.

TABLE 1

| Value of K | Value of uncertainty |
|---|---|
| 0 | 0 m |
| 1 | 1 m |
| 2 | 2.1 m |
| — | — |
| 20 | 57.3 m |

TABLE 1-continued

| Value of K | Value of uncertainty |
|---|---|
| 40 | 443 m |
| 60 | 3 km |
| 80 | 20 km |
| 100 | 138 km |
| 120 | 927 km |
| 127 | 1800 km |

When the accuracy of the location information (for example, r, K, C, etc.) exceeds the threshold value, the UE 100 can determine that the location information has been acquired. On the other hand, when the accuracy of the location information is equal to or less than the threshold value, the UE 100 can determine that the location information cannot be acquired. For example, the UE 100 calculates an error distance between the value indicated by the acquired location information and the actual location, based on the above-described equation. When the error distance is within the threshold value (for example, 5 m), the UE 100 can determine that the location information can be acquired. On the other hand, when the error distance exceeds the threshold value (for example, 5 m), the UE 100 determines that the location information cannot be acquired.

This operation may be executed in means for identifying other locations, not GNSS signals.

Third, the UE 100 performs the determination according to the signaling from the eNB 200.

For example, when the UE 100 cannot receive predetermined signaling from the eNB 200, the UE 100 may determine that the use conditions are satisfied. When receiving the predetermined signaling from the eNB 200, the UE 100 may determine that the use conditions are not satisfied.

For example, when the special radio resource (resource pool) is allocated by the eNB 200, the UE 100 may determine that the use conditions are satisfied. That is, when receiving the information of the special radio resource from the eNB 200, the UE 100 may determine that the use conditions are satisfied. When receiving use permission of the special radio resource from the eNB 200, the UE 100 may determine that the use conditions are satisfied.

The eNB 200 (network) may transmit the information/the use permission of the special radio resource to the UE 100 when the UE 100 enters an area (special area) where the UE 100 cannot acquire the location information. The eNB 200 (network) may store in advance a region (special area) where the reception sensitivity of the GNSS signal is low or where the GNSS signal cannot be received. For example, the special area is an area inside the tunnel. The eNB 200 can determine whether or not the UE 100 enters the special area based on the location information or the like reported from the UE 100. In accordance with the timing at which the UE 100 enters the special area, the eNB 200 (network) may transmit the information/the use permission of the special radio resource to the UE 100.

The eNB 200 may transmit normal signaling indicating that the normal resources is usable (use permission) as predetermined signaling. When the UE 100 fails to receive the signaling, the UE 100 may determine that the use conditions of the special radio resource are satisfied. When the UE 100 successfully receives the signaling, the UE 100 may determine that the use conditions of the special radio resource are not satisfied.

Fourth, the UE 100 may determine based on use conditions associated with (corresponding to) a special radio resource.

For example, the special radio resource may be associated with an expiration date. Only a special radio resource that is within the expiration date may be usable for the UE 100. The expiration date may be an absolute time (date and time). The expiration date may be a relative value, counting of which is started when the UE 100 receives the information of the special radio resource. For example, the special radio resource may be usable for the UE 100 unless a predetermined period of time has elapsed since the UE 100 received the information of the special radio resource. The special radio resource may be not usable for the UE 100 after the predetermined period has elapsed.

In the case where the UE 100 calculates a zone based on the estimated location information, parameters for calculating the zone (parameters for determining the radio resource to be used) may include a time parameter. For example, the time parameter is the elapsed time since the UE 100 received the information of the special radio resource. For example, when the UE 100 receives the information of the special radio resource before entering the tunnel, the actual location of the UE 100 changes depending on the elapsed time. Therefore, the UE 100 can determine an appropriate special radio resource by calculating the zone using the time parameter (that is, by determining the special radio resource).

The zone may be calculated such that the same special radio resource (resource pool) can be continuously used based on the time parameter. That is, in the special area, the moving UE 100 may continue to use the same special radio resource (resource pool). As a result, in the special area, the zone calculated by the UE 100 may move with the movement of the UE 100.

Regardless of whether the UE 100 calculates the zone based on the estimated location information, parameters for calculating the zone (parameters for determining the radio resource to be used) include a time parameter. For example, the time parameter is a parameter that makes the special radio resource usable at the timing when the UE 100 enters the special area.

Taking into account the timing at which the UE 100 enters the special area based on, for example, the location information of the UE 100, the eNB 200 (cell/network) may transmit (set) the information of the special radio resource to the UE 100. Thus, before the UE 100 moves outside the coverage, the information of the special radio resource that is usable after the UE 100 enters the special area can be set in the UE 100.

When the UE 100 is in the special area, the eNB 200 (cell/network) may transmit (set), to the UE 100, the information of a different special radio resource depending on the elapsed time in which the UE 100 is located in the special area. For example, the eNB 200 installed in the special area may transmit, to the UE 100, the information of the special radio resource determined depending on the elapsed time (time parameter) from a reference timing. The reference timing is, for example, a timing at which the UE 100 passes a predetermined point and/or a timing calculated from an offset value according to the location information of the UE 100. In general, as the elapsed time of the UE 100 increases, the travel distance of the UE 100 increases. Therefore, the eNB 200 can appropriately allocate a special radio resource to the UE 100 by deciding the special radio resource depending on the time parameter. As a result, in the special area, the zone in which the UE 100 is located may be regarded as being arranged at a location corresponding to the elapsed time from when the UE 100 enters the special area.

As described above, the UE 100 can appropriately determine, by the above-described method, whether or not the special radio resource can be used.

Second Embodiment

Figure 18:
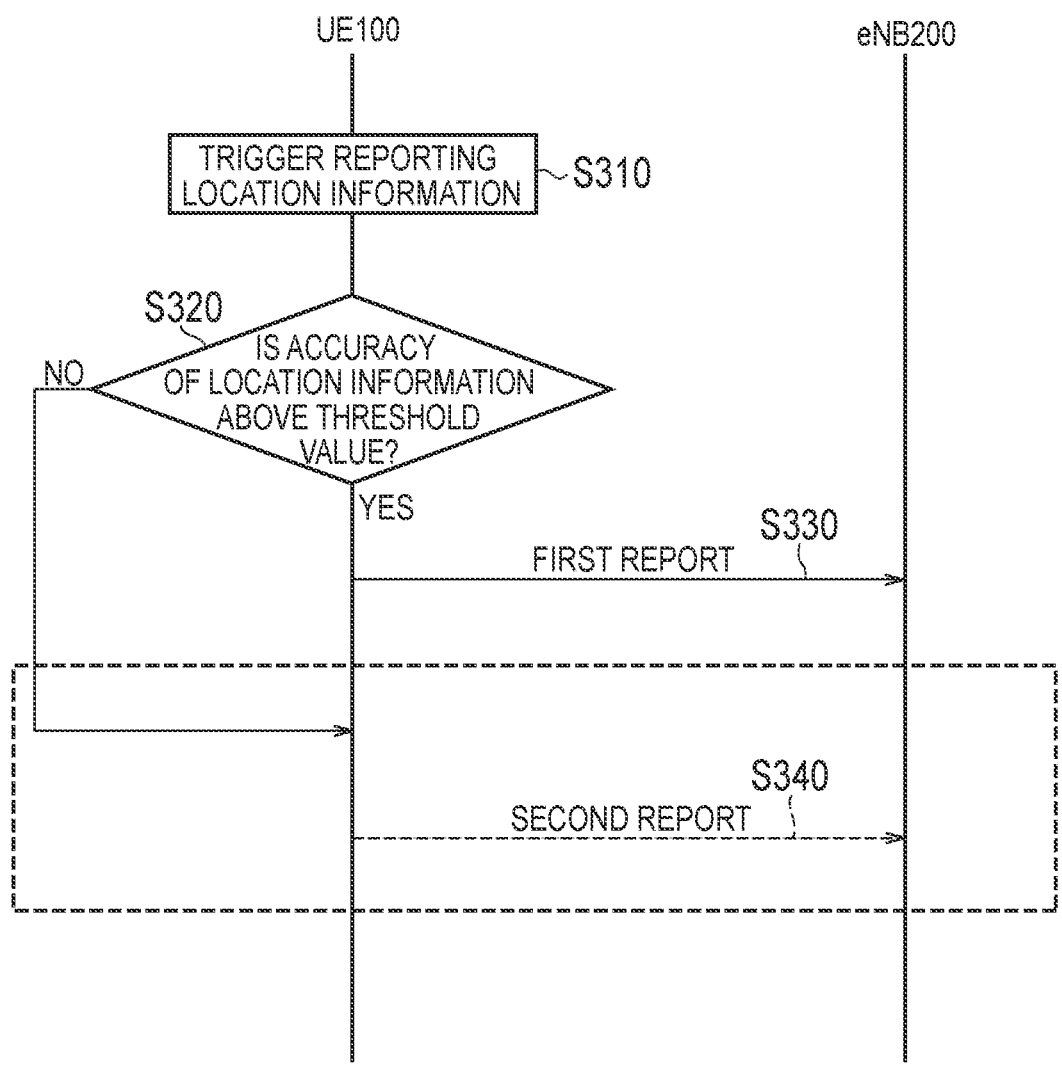
FIG. 18 is a sequence chart for describing an operation according to a second embodiment.

A second embodiment will be described with reference to FIG. 18. FIG. 18 is a sequence chart for describing an operation according to the second embodiment.

In the second embodiment, reporting of the location information of the UE 100 will be described. The reporting method may be applied to the above-described first embodiment.

In the following, although signaling from the UE 100 to the eNB 200 is described, it may be signaling from the UE 100 to a network (for example, an MME, the server 600, etc.).

As illustrated in FIG. 18, in step S310, reporting of the location information of the UE 100 is triggered in the UE 100. This trigger may be set by the eNB 200.

In step S320, the UE 100 determines whether or not the accuracy of the location information held by the UE 100 is equal to or more than a threshold value. The determination method is the same as that described above.

If the accuracy of the location information is equal to or more than the threshold value, the UE 100 executes the process of step S330. If the accuracy of the location information is less than the threshold value, the UE 100 executes the process of step S340. When the location information cannot be acquired (for example, the reception of the GNSS signal has failed), the UE 100 may determine that the accuracy of the location information is less than the threshold value.

In step S330, the UE 100 reports the location information. Specifically, the UE 100 transmits, to the eNB 200, a first report including the location information determined to be equal to or more than the threshold value. In the first report, the location information is, for example, location information based on the GNSS signal. The location information may be detailed location information (acquired by other means).

In step S340, the UE 100 transmits a second report different from the first report to the eNB 200. Accordingly, the UE 100 stops transmitting the first report to the eNB 200 even when transmission of a report (first report) is triggered. When the UE 100 stops transmitting the first report, the UE 100 may end the process. The UE 100 may transmit the second report to the eNB 200 instead of the first report.

The UE 100 transmits, to the eNB 200, information indicating that the accuracy of the location information is less than the threshold value instead of the first report. The UE 100 may transmit the second report including that information and the location information to the eNB 200-2. The eNB 200 can know that the accuracy of the location information is low. The location information included in the second report is information of lower accuracy than the location information included in the first report.

The UE 100 may transmit the second report that does not include the location information to the eNB 200-2. That information may indicate the reason for not including the location information. Thus, the message size can be reduced.

If the UE 100 has acquired the above-described estimated location information, the UE 100 may include the estimated location information in the second report. The UE 100 may include the estimated location information in the second report only when the UE 100 cannot receive the GNSS signal (the UE 100 determines so). The second report may include information (for example, 1-bit flag information) indicating that it is the estimated location information.

The second report may be a message format different from the first report. The eNB 200 may determine whether the report is the first report or the second report based on the message format. The first report and the second report may be in the same format. The eNB 200 may determine whether the report is the first report or the second report based on a flag (for example, 1-bit information) included in the report.

As described above, when the accuracy of the location information is low, the UE 100 can stop reporting the location information with low accuracy to the eNB 200. Thus, it is possible to prevent the eNB 200 from executing control according to the locational information with large error. The UE 100 shows to the eNB 200 that the accuracy of the location information is low, and thus can utilize the location information after the eNB 200 recognizes that the accuracy of the location information is low.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the above-described first embodiment, the special radio resource may be only a transmission resource pool. The special radio resource does not have to be applied to a reception resource pool. The UE 100 may recognize the special radio resource as a transmission resource pool and then use it as a reception resource pool.

When the UE 100 (and the eNB 200/the network) selects a time/frequency resource to be used for actually transmitting a radio signal from the radio resources (resource pools) determined as special radio resources, the UE 100 may select it according to another parameter. For example, the other parameter is the identifier of the UE 100 (for example, UE ID, C-RNTI (Cell-Radio Network Temporary Identifier), etc.). Thus, even when a plurality of UEs 100 determine the same radio resource (resource pool) as the special radio resource, it is possible to reduce the fact that the time/frequency resources actually used for transmitting the radio signals are the same. As a result, it is possible to reduce the collision of radio signals due to the V2X communication.

In the above description, the information (for example, the information of the special radio resource, the use permission, the use conditions, the threshold value, etc.) included in the signaling from the above eNB 200 to the UE 100 may be provided from another eNB 200 (neighbour eNB).

Figure 19:
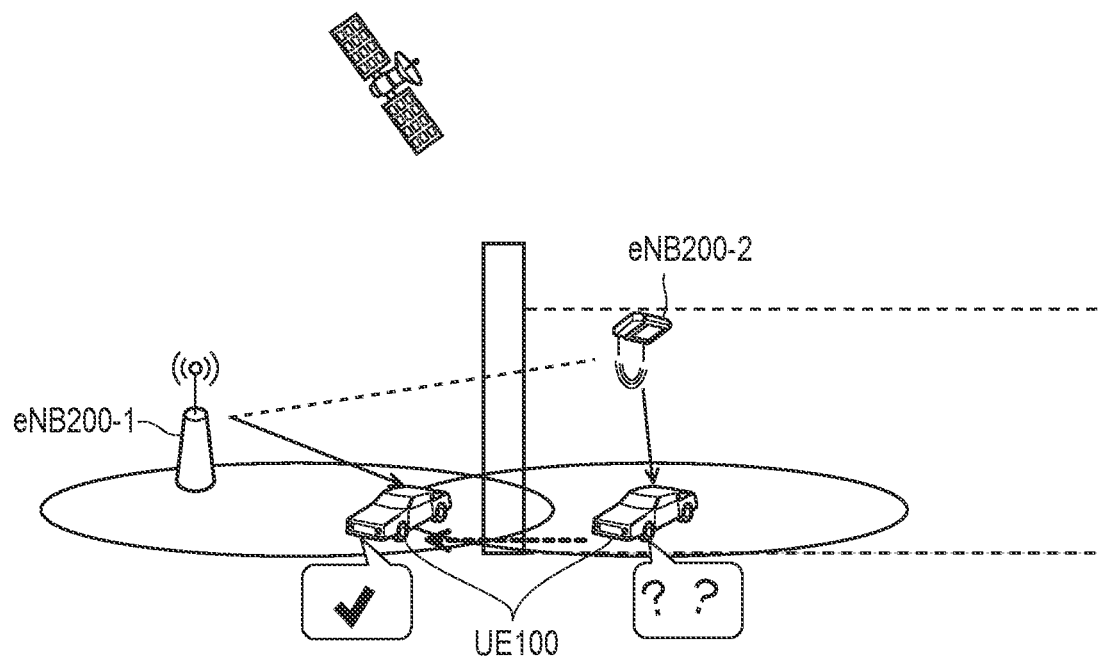
FIG. 19 is a diagram for describing an operation according to other embodiments.

For example, as illustrated in FIG. 19, the eNB 200-1 may transmit information indicating, for example, the normal resources being usable (use permission) and/or a threshold (GNSS use threshold) to the eNB 200-2. The eNB 200-1 installed outside the tunnel may transmit that information to the eNB 200-2 installed inside the tunnel.

For example, that information may be included in, when the UE 100 executes a handover from the eNB 200-2 (serving) to the eNB 200-1 (target), a handover request acknowledgment (HO Request ACK) message from the eNB 200-2 to the eNB 200-1. The handover request acknowledgment is a message transmitted to notify the source eNB of the resources prepared at the target eNB. The handover request acknowledgment is a response message to the handover request from the source eNB. The eNB 200-1 may transmit, as that information, setting information in the cell to which the UE 100 executes a handover to the eNB 200-2.

The eNB 200-2 can transmit that information received from the eNB 200-1 to the UE 100 in its own cell. The eNB 200-2 may transmit that information to the UE 100 by using, for example, a handover command. Since the UE 100-1 can receive that information in the eNB 200-1 early, the UE 100-1 can perform the determination without delay.

In the above description, parameters for calculating the zone (parameters for determining the radio resource to be used) include a time parameter, but it is not limited thereto. The parameters for calculating the zone may include a parameter of the speed (speed parameter) of the UE 100. The UE 100 or the eNB 200 (network) can decide the radio resource to be used by using the time parameter and the speed parameter, thereby improving the accuracy of the correspondence relationship between the geographical location and the radio resource to be used.

The operation according to each of the above-described embodiments may be combined to be executed, where necessary. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium.

If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM.

A chip may be provided which is configured by: a memory for storing a program for performing each process performed by any one of the UE 100 and the eNB 200; and a processor for executing the program stored in the memory.

In the above-described embodiments, an LTE system is described as an example of the mobile communication system; however, the LTE system is not an exclusive example, and the content according to the present application may be applied to a system other than the LTE system.

The entire content of Japanese Patent Application No. 2016-147249 (filed on Jul. 27, 2016) is incorporated in the present specification by reference.

The invention claimed is:

1. A communication device, comprising:
a transmitter configured to directly transmit a radio signal to another communication device, wherein
the transmitter is configured to
transmit, when first location information indicating a geographical location of the communication device is acquired, the radio signal, based on a first radio resource associated with a location indicated by the first location information, and
transmit, when the communication device cannot acquire the first location information, the radio signal, based on a second radio resource, wherein the second radio resource is a radio resource not associated with the unacquired geographical location of the communication device, and is available to the communication device only when the first location information indicating the geographical location is not acquired.

2. The communication device according to claim 1, wherein
the transmitter is configured to transmit, to a network, information indicating that the communication device cannot acquire the first location information, and
the communication device further comprises a receiver configured to receive information of the second radio resource decided by the network from a base station.

3. The communication device according to claim 1, further comprising
a controller configured to estimate the geographical location of the communication device, wherein
the second radio resource is decided based on the estimated location.

4. The communication device according to claim 3, wherein
the transmitter is configured to transmit second location information to a network, and
the communication device further comprises a receiver configured to receive information of the second radio resource decided by the network from a base station.

5. The communication device according to claim 1, further comprising:
a receiver configured to directly receive a second radio signal from another communication device; and
a controller configured to decide the second radio resource based on a transmission resource used for transmitting the second radio signal based on predetermined information.

6. The communication device according to claim 1, further comprising
a controller configured to store a use condition of the second radio resource, wherein
the transmitter is configured to transmit the radio signal based on the second radio resource when the use condition is satisfied.

7. The communication device according to claim 6, wherein
the use condition is satisfied when a value corresponding to a reception state of the first location information in the communication device exceeds a threshold value.

8. The communication device according to claim 6, wherein
the controller is configured to calculate a value indicating an accuracy of the first location information, and
the use condition is satisfied when the value exceeds a threshold value.

9. A base station, comprising:
a transmitter configured to transmit information of a first radio resource associated with a geographical location to a communication device, wherein
the information of the first radio resource is used to directly transmit a radio signal from the communication device to another communication device when first location information indicating a geographical location of the communication device is acquired,
the transmitter is configured to transmit information of a second radio resource to the communication device,
the information of the second radio resource is used to transmit the radio signal when the first location information indicating the geographical location of the communication device cannot be acquired, and the second radio resource is a radio resource not associated with the unacquired geographical location of the communication device, and is available to the communication device only when the first location information indicating the geographical location is not acquired.

10. The base station according to claim 9, wherein
the transmitter is configured to transmit the information of the second radio resource when the communication device enters an area where the first location information cannot be acquired.

11. The base station according to claim 9, wherein
the transmitter is configured to transmit the information of the second radio resource to the communication device only when the communication device establishes a connection with the base station, and
the second radio resource is available only while the communication device establishes the connection with the base station.

* * * * *